(12) United States Patent
Oshima

(10) Patent No.: US 12,472,848 B2
(45) Date of Patent: Nov. 18, 2025

(54) SEAT EXPERIENCE SYSTEM

(71) Applicant: TS TECH CO., LTD., Asaka (JP)

(72) Inventor: Yuki Oshima, Shioya-gun Tochigi (JP)

(73) Assignee: TS TECH CO., LTD., Saitama (JP)

( * ) Notice: Subject to any disclaimer, the term of this patent is extended or adjusted under 35 U.S.C. 154(b) by 105 days.

(21) Appl. No.: 18/342,355

(22) Filed: Jun. 27, 2023

(65) Prior Publication Data

US 2023/0339368 A1 Oct. 26, 2023

Related U.S. Application Data

(63) Continuation of application No. PCT/JP2021/045345, filed on Dec. 9, 2021.

(30) Foreign Application Priority Data

Dec. 28, 2020 (JP) .................. 2020-218988
Dec. 28, 2020 (JP) .................. 2020-218999

(51) Int. Cl.
*B60N 2/00* (2006.01)
*B60N 2/02* (2006.01)
*B60W 10/30* (2006.01)

(52) U.S. Cl.
CPC ......... *B60N 2/0023* (2023.08); *B60N 2/0022* (2023.08); *B60N 2/0273* (2023.08); *B60W 10/30* (2013.01); *B60N 2002/0208* (2013.01); *B60W 2540/01* (2020.02); *B60W 2540/22* (2013.01); *B60W 2710/30* (2013.01)

(58) Field of Classification Search
CPC .. B60N 2/0023; B60N 2/0027; B60N 2/0268; B60N 2/0273; B60N 2002/0208; B60W 2540/01; B60W 2540/22

USPC .......................................................... 701/49
See application file for complete search history.

(56) References Cited

U.S. PATENT DOCUMENTS 9,500,489 B1  11/2016  Ng
10,470,697 B2 11/2019  Sugiyama
(Continued)

FOREIGN PATENT DOCUMENTS

CN  110785314 A  2/2020
JP  H09109747 A  4/1997
(Continued)

OTHER PUBLICATIONS

Notice of Reasons for Refusal issued for Japanese Patent Application No. 2020-218988, Dispatch date: Oct. 1, 2024, 14 pages including English machine translation.
(Continued)

*Primary Examiner* — Erick R Solis
(74) *Attorney, Agent, or Firm* — HSML P.C.

(57) ABSTRACT

A seat experience system includes a seat and a controller. The seat has a seat body and a sensor. The sensor is configured to acquire biogenic information of an occupant seated on the seat body. The controller is configured to acquire the biogenic information from the sensor, determine whether or not the occupant is in a resting state based on the biogenic information, execute, if the occupant is in the resting state, control in a first mode to sustain the resting state, and execute, if the occupant is not in the resting state, control in a second mode different from the first mode.

15 Claims, 16 Drawing Sheets

(56) References Cited

U.S. PATENT DOCUMENTS

| | | | |
|---|---|---|---|
| 2014/0217792 A1* | 8/2014 | Meyer | B60N 2/66 297/354.1 |
| 2016/0199238 A1* | 7/2016 | Yamada | B25J 9/1679 901/46 |
| 2018/0215286 A1 | 8/2018 | Fujimoto | |
| 2019/0053748 A1 | 2/2019 | Sugiyama | |
| 2021/0221258 A1* | 7/2021 | Ekchian | B60N 2/42 |
| 2022/0104743 A1* | 4/2022 | Shibagaki | A61B 5/4806 |
| 2022/0371475 A1* | 11/2022 | Dillinger | B60N 2/10 |

FOREIGN PATENT DOCUMENTS

| | | | |
|---|---|---|---|
| JP | 2000174782 A | 6/2000 | |
| JP | 2007203913 A | 8/2007 | |
| JP | 2008120271 A | 5/2008 | |
| JP | 2010008268 A | 1/2010 | |
| JP | 2017065504 A | 4/2017 | |
| JP | 2017080297 A | 5/2017 | |
| JP | 2018065420 A | 4/2018 | |
| JP | 2018122614 A | 8/2018 | |
| JP | 2020171734 A | 10/2020 | |
| JP | 2020174782 A | 10/2020 | |
| WO | 2020255514 A1 | 12/2020 | |

OTHER PUBLICATIONS

Notice of Reasons for Refusal issued for Japanese Patent Application No. 2020-218999, Dispatch date: Oct. 1, 2024, 10 pages including English machine translation.

International Search Report issued for International Patent Application No. PCT/JP2021/045345, Date of mailing: Mar. 1, 2022, 7 pages including English translation.

Written Opinion issued for International Patent Application No. PCT/JP2021/045345, Date of mailing: Mar. 1, 2022, 15 pages including English translation.

Notice of Reasons for Refusal issued for Japanese Patent Application No. 2020-218988, Dispatch date: Apr. 22, 2025, 8 pages including English machine translation.

Decision of Refusal issued for Japanese Patent Application No. 2020-218999, Dispatch date: Apr. 22, 2025, 6 pages including English machine translation.

Office Action issued for Chinese Patent Application No. 202180087750.5, dated Aug. 5, 2025, 12 pages including English machine translation.

* cited by examiner

SEAT EXPERIENCE SYSTEM

REFERENCE TO RELATED APPLICATIONS

This application is a continuation application of International Application No. PCT/JP2021/045345 filed on Dec. 9, 2021 which claims priority from Japanese Patent Application Nos. 2020-218988 and 2020-218999 filed on Dec. 28, 2020. The disclosures of these applications are incorporated herein by reference in their entirety.

TECHNICAL FIELD

The present disclosure relates to a seat experience system comprising a seat including a sensor.

BACKGROUND ART

A car seat conventionally known in the art includes a plurality of pressure sensors provided in the seat to detect a sitting posture of an occupant seated on the seat (JP 2017-65504 A).

Since such a conventional car seat only evaluates and presents the sitting posture of the occupant, the car seat is not effectively used. Incidentally, while a vehicle is running, the occupant may assume a resting state by vibrations or other comfortable conditions experienced in the vehicle. However, no measures have been taken in a conventional car seat to sustain such resting state.

Further, a seat conventionally known in the art, not limited to a car seat, includes a seat cushion and a seat back, and is configured to change an angle of the seat back relative to the seat cushion in response to commands from a hand-held controller or the like. An occupant seated on such a seat with the seat back reclined to an approximately horizontal position may feel relaxed and assume a resting state. However, if a command to move the seat back up as outputted in this situation causes the seat back to move back up at a high speed or by a large amount of movement, this resting state cannot be sustained.

DESCRIPTION

It is desirable to provide a new value for a seat, particularly, to provide a seat experience system such that when an occupant seated on the seat is in a resting state, the resting state can be sustained.

In light of the above, a seat experience system comprising a seat and a controller is suggested. The seat comprises a seat body, and a sensor configured to acquire biogenic information of an occupant seated on the seat body. The controller acquires the biogenic information from the sensor. The controller determines whether or not the occupant is in a resting state, based on the biogenic information. The controller executes, if the occupant is in the resting state, control in a first mode to sustain the resting state, and executes, if the occupant is not in the resting state, control in a second mode different from the first mode.

In one aspect, the seat experience system comprises a seat and a controller. The seat comprises a seat body comprising a movable part, a sensor configured to acquire biogenic information of an occupant seated on the seat body, and a drive unit for operating the movable part. The controller is configured to acquire the biogenic information from the sensor.

The controller determines whether or not the occupant is in a resting state based on the biogenic information, and controls operation of the movable part based on whether or not the occupant is in the resting state.

According to this configuration, by controlling the operation of the movable part based on whether or not the occupant is in the resting state, control in the first mode different from the second mode can be executed, i.e., the speed of the movable part can be made slower, and/or the amount of movement of the movable part can be made smaller, for example, when the occupant is in the resting state, to thereby sustain the resting state of the occupant.

The controller may be configured to cause the movable part to move at a first speed if it is determined that the occupant is in the resting state, and to cause the movable part to move at a second speed if it is determined that the occupant is not in the resting state, wherein the first speed is slower than the second speed. In other words, the controller causes the movable part to move at the first speed in the first mode and at the second speed in the second mode, wherein the first speed is slower than the second speed.

In this case, since the speed of the movable part is made slower if the occupant is in the resting state, the resting state of the occupant can be sustained.

The movable part may comprise a seat back rotatable relative to a seat cushion, and the drive unit may be configured to cause the seat back to rotate.

According to this configuration, by determining whether or not the occupant is in the resting state when the seat back is to be rotated, control in the first mode in which the seat back is rotated at a slower speed can be executed when the occupant is in the resting state, to sustain the resting state of the occupant.

The movable part may further comprise an ottoman rotatable relative to the seat cushion, and the drive unit may be configured to cause the ottoman to rotate.

According to this configuration, by determining whether or not the occupant is in the resting state when the ottoman is to be rotated, control in the first mode in which the ottoman is rotated at a slower speed can be executed when the occupant is in the resting state, to sustain the resting state of the occupant.

The posture of the seat may be changeable between a first posture in which the seat back forms a first angle with respect to a horizontal plane, and a second posture in which the seat back forms a second angle, smaller than the first angle, with respect to the horizontal plane. The controller may be configured to determine, upon receipt of a command to change the posture of the seat from the second posture to the first posture, whether or not the occupant is in the resting state.

According to this configuration, since it is determined whether or not the occupant is in the resting state when the seat back is to be moved back up, control in the first mode in which the seat back is moved back up at a slower speed can be executed if the occupant is in the resting state, so that the resting state of the occupant can be sustained.

The controller may be configured to control the drive unit such that the ottoman forms a third angle with respect to a seating surface of the seat cushion when the seat assumes the first posture, and the ottoman forms a fourth angle, smaller than the third angle, with respect to the seating surface of the seat cushion when the seat assumes the second posture.

According to this configuration, since control in the first mode in which the ottoman is rotated downward at a slower speed can be executed if the occupant is in the resting state, the resting state of the occupant can be sustained.

The seat experience system may be configured to further comprise a speaker that produces a sound. The controller may be configured to adjust a volume of the speaker when the speaker is producing the sound, such that if the occupant is in the resting state, the volume of the speaker is turned down. That is, the controller may be configured to adjust a volume of the speaker in the first mode to a volume smaller than a volume of the speaker in the second mode.

According to this configuration, since control in the first mode in which the volume of the speaker is turned down is executed if the occupant is in the resting state, the resting state of the occupant can be sustained.

Another aspect of the seat experience system is disclosed herein, which comprises a seat comprising a seat body and a sensor configured to acquire biogenic information of an occupant seated on the seat body, and a controller configured to acquire the biogenic information from the sensor. In this seat experience system, the seat is a vehicle seat, and the seat body is installed in a vehicle. The controller is capable of executing a navigation process for navigating the vehicle to a destination according to a route set by the occupant. If it is determined, based on the biogenic information, that the occupant is in a resting state while the vehicle is being navigated according to the route set by the occupant in the navigation process, the controller presents a route with a driving distance longer than a driving distance of the route set by the occupant. In other words, the controller is configured such that when the navigation process is executed in the second mode, the route set by the occupant is presented; and when the navigation process is executed in the first mode, a route with a driving distance longer than a driving distance of the route set by the occupant is presented.

According to this configuration, if the occupant seated on the seat assumes the resting state while the vehicle is being driven, control in the first mode is executed, in which the route with the driving distance longer than the driving distance of the route set by the occupant is presented. Thus, the resting state of the occupant can be sustained if the occupant selects the presented route.

The controller may be configured to be capable of discriminating sleep states of the occupant, based on the biogenic information, at least between a first sleep state and a second sleep state having a quality of sleep lower than a quality of sleep of the first sleep state, and to present a proposal for switching to a manual drive mode if a sleep state of the occupant becomes the second sleep state while the vehicle is being driven in an autonomous drive mode.

According to this configuration, if the sleep state of the occupant becomes the second sleep state while the vehicle is being driven in an autonomous drive mode, the proposal for switching to a manual drive mode is presented. Thus, it is possible to make the occupant in a state more conscious than the first sleep state, to more easily become aware of the proposal for switching to the manual drive mode.

The controller may be configured to be capable of discriminating sleep states of the occupant, based on the biogenic information, at least between a first sleep state and a second sleep state having a quality of sleep lower than a quality of sleep of the first sleep state, and to present a proposal for switching to a manual drive mode if a predetermined time period has elapsed after a sleep state of the occupant has become the first sleep state while the vehicle is being driven in an autonomous drive mode.

According to this configuration, the proposal for switching to the manual drive mode is presented if the predetermined time period has elapsed after the sleep state of the occupant has become the first sleep state, i.e., if the occupant is in a state more conscious than the first sleep state, while the vehicle is being driven in an autonomous drive mode.

Thus, the occupant in a state more conscious than the first sleep state can more easily become aware of the proposal for switching to the manual drive mode, and the occupant can drive in a conscious state when the drive mode is switched to the manual drive mode.

The sensor may comprise a respiratory sensor that acquires respiratory information of the occupant, and the controller may discriminate the sleep states of the occupant based on the respiratory information.

According to this configuration, the sleep states of the occupant can be clearly discriminated based on the respiratory information.

The sensor may comprise a brain-wave sensor that acquires brain wave information of the occupant, and the controller may discriminate the sleep states of the occupant based on the respiratory information and the brain wave information.

According to this configuration, since the sleep states of the occupant are discriminated based on the respiratory information and the brain wave information, the sleep states of the occupant can be discriminated accurately.

The sensor may comprise a pressure sensor that acquires a value of pressure from the occupant, and the controller may discriminate the sleep states of the occupant based on the respiratory information and the value of pressure.

According to this configuration, since the sleep states of the occupant are discriminated based on the respiratory information and the value of pressure, the sleep states of the occupant can be discriminated accurately.

The seat experience system may further comprise a server capable of communicating with the controller. The controller may be configured to transmit the biogenic information acquired from the sensor to the server together with identification information of the occupant, and the server may store the biogenic information transmitted from the controller together with the identification information.

According to this configuration, since the biogenic information of the occupant is stored in the server together with the identification information, various processes may be performed in the controller based on the biogenic information stored in the server.

The controller may provide a notification of the biogenic information acquired from the sensor.

According to this configuration, since the controller provides the notification of the biogenic information, the occupant can check his/her biogenic information.

The above aspects, other advantages and further features will become more apparent by describing in detail illustrative, non-limiting embodiments thereof with reference to the accompanying drawings, in which.

A detailed description will be given of a first example of a seat experience system with reference to FIGS. 1 to 9.

Figure 1:
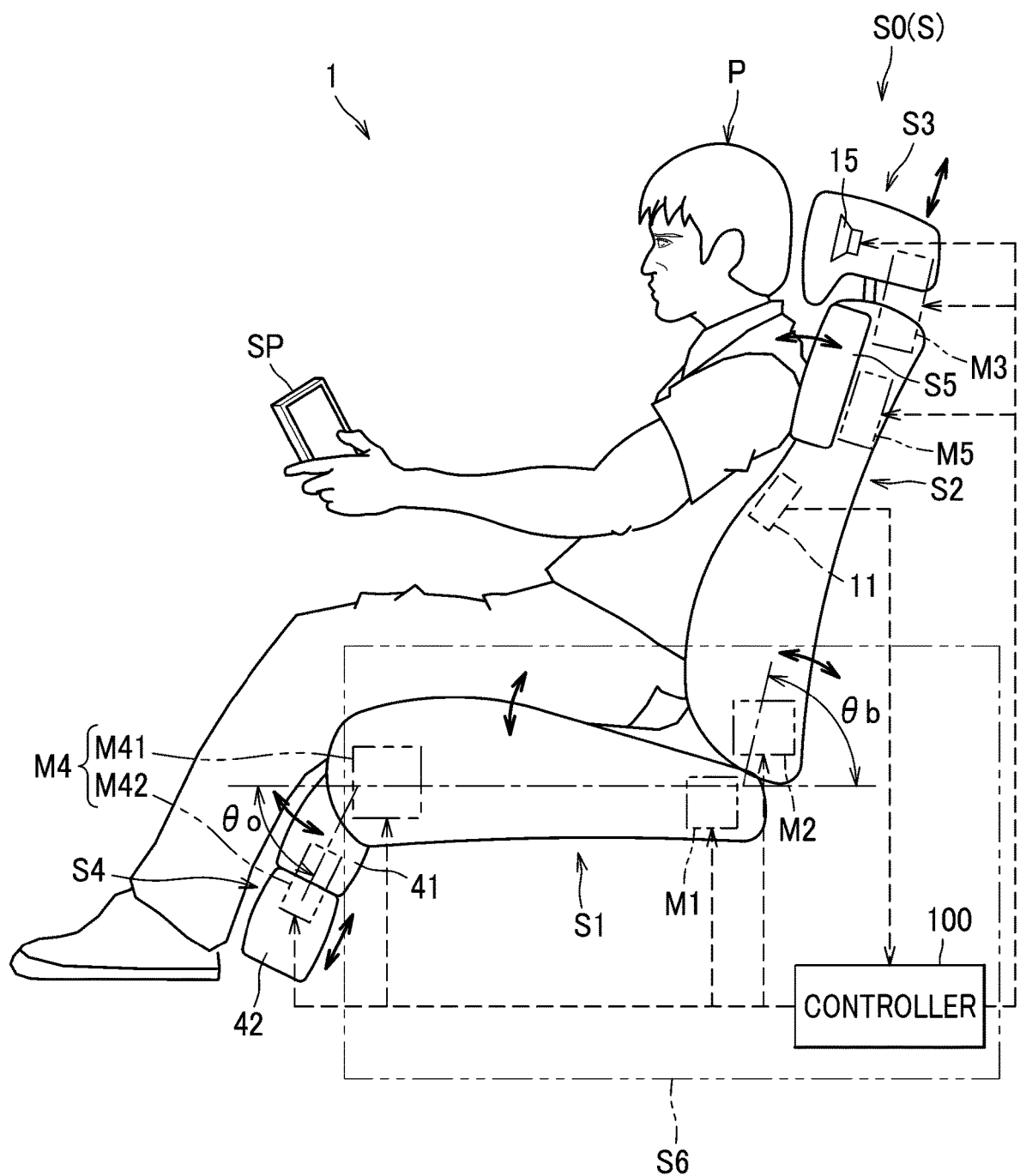
FIG. 1 is an illustration of a seat experience system according to a first example.

As shown in FIG. 1, the seat experience system 1 comprises a seat S, and a controller 100. In the following description, the front/rear (forward/rearward), left/right (lateral), up/down (upward/downward, upper/lower) directions or positions are designated with respect to an occupant P seated on the seat S.

The seat S comprises a seat body S0. The seat body S0 comprises a seat cushion S1, a seat back S2, a headrest S3, an ottoman S4, a support pad S5, and a support fixture S6. The seat cushion S1, the seat back S2, the headrest S3, the ottoman S4, the support pad S5, and the support fixture S6 each comprise a cushion pad and an outer covering with which the cushion pad is covered.

The support fixture S6 includes an armrest for the occupant P and is installed on a floor surface. The seat cushion S1, the seat back S2, the headrest S3, the ottoman S4, and the support pad S5 are movable parts movable relative to the support fixture S6.

Specifically, a rear end of the seat cushion S1 is rotatably supported by the support fixture S6. The seat cushion S1 is rotatable between an initial position and a tilted position. The seating surface of the seat cushion S1 in the initial position is oriented approximately horizontal, i.e., generally parallel to a horizontal plane. A front end of the seat cushion S1 in the tilted position is located above the front end of the seat cushion S1 in the initial position.

A lower end of the seat back S2 is rotatably supported by the rear end of the seat cushion S1. The seat back S2 is rotatable between an initial position and a reclined position. The seat back S2 in the initial position is oriented at a first angle (for example, approximately 90 degrees) with respect to the horizontal plane. The angle the seat back S2 forms with respect to the horizontal plane will be hereinafter referred to as "seat back angle θb". The seat back angle θb of the seat back S2 in the reclined position is a second angle smaller than the first angle.

The ottoman S4 comprises an upper portion 41 rotatably supported on a front end of the seat cushion S1, and a lower portion 42 movable in the up-down direction relative to the upper portion 41. The upper portion 41 of the ottoman S4 is rotatable between an initial position and a reclined position. The upper portion 41 of the ottoman S4 in the initial position is oriented at a third angle (for example, approximately 90 degrees) with respect to the seating surface of the seat cushion S1. The angle the upper portion 41 of the ottoman S4 forms with respect to the seating surface of the seat cushion S1 will be hereinafter referred to as "ottoman angle θo". The ottoman angle θo of the upper portion 41 of the ottoman S4 in the reclined position is a fourth angle smaller than the third angle. The lower portion 42 of the ottoman S4 is movable between an initial position closest to the upper portion 41 and a separated position furthest from the upper portion 41.

The support pad S5 supports the shoulders of the occupant P seated on the seat S. The support pad S5 is movable in the front-rear direction together with the headrest S3, relative to the seat back S2. The support pad S5 is movable between an initial position closest to the seat back S2 and a separated position furthest from the seat back S2.

The headrest S3 is movable in the up-down direction relative to the support pad S5. The headrest S3 is movable between an initial position closest to the support pad S5 and a separated position furthest from the support pad S5.

The seat S further comprises drive units M1 to M5 for respectively operating the aforementioned movable parts, a heartbeat sensor 11 as an example of a sensor, and a speaker 15. The drive units M1 to M5 each comprise a motor, a gear, and other components. The drive unit M1 is a device that causes the seat cushion S1 to rotate. The drive unit M2 is a device that causes the seat back S2 to rotate and comprises, for example, a reclining mechanism. The drive unit M3 is a device that causes the headrest S3 to move up and down. The drive unit M5 is a device that causes the support pad S5 to move forward and rearward.

The drive unit M4 comprises a rotation device M41 and a lifting and lowering device M42. The rotation device M41 causes the upper portion 41 of the ottoman S4 to rotate. The lifting and lowering device M42 causes the lower portion 42 of the ottoman S4 to move up and down. The rotation device M41 and the lifting and lowering device M42 both comprise a motor, a gear, and other components.

The heartbeat sensor 11 is a sensor for acquiring heartbeat information which is biogenic information of the occupant P seated on the seat body S0. The heartbeat sensor 11 is located on a backside of the outer covering of the seat back S2.

The speaker 15 is a device that produces a sound and is located on a backside of the outer covering of the headrest S3.

The controller 100 comprises a central processing unit (CPU), a read-only memory (ROM), a random-access memory (RAM), a rewritable nonvolatile memory, etc. (not shown), and has a function of executing pre-stored programs. The controller 100 is capable of communicating with a smartphone SP and acquiring the heartbeat information from the heartbeat sensor 11. The controller 100 has a function of controlling the drive units M1 to M5 and/or the speaker 15 based on commands received from the smartphone SP and the heartbeat information acquired from the heartbeat sensor 11. The controller 100 further has a function of outputting the heartbeat information to the smartphone SP.

The smartphone SP is configured to be capable of outputting to the controller 100 a posture command for changing the posture of the seat S, and a play-music command or a stop-music command for playing or stopping playing music. The music data to be played may be stored in the smartphone SP or in the controller 100.

The smartphone SP is configured to be capable, by an application installed therein for operating the seat S (hereinafter referred to also as "seat app"), of displaying images shown in FIGS. 2 to 6 and outputting the posture command, and the play-music command or the stop-music command to the controller 100. Specifically, when the occupant P launches the seat app, the smart phone SP displays on a screen thereof an image of a main menu shown in FIG. 2.

The smartphone SP displays, on its screen displaying the main menu, buttons B1 to B5 for selecting various modes. The button B1 is a button for transitioning to a preset mode for changing the posture of the seat S to a posture set as a default posture. When the button B1 is selected, the smartphone SP displays on its screen an image shown in FIG. 3.

Figure 3:
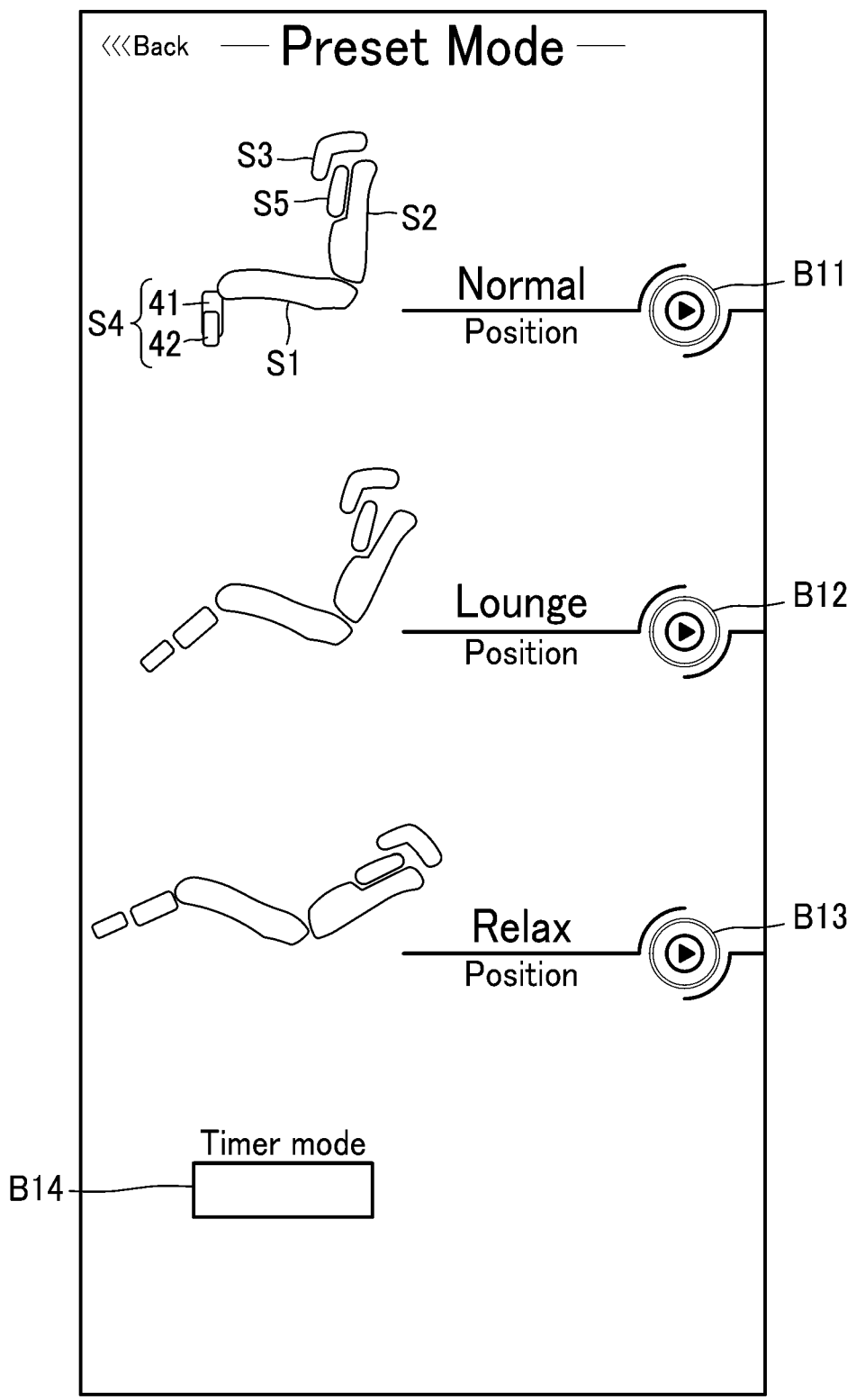
FIG. 3 is an illustration of a screen showing an image of a preset mode.
Figure 4:
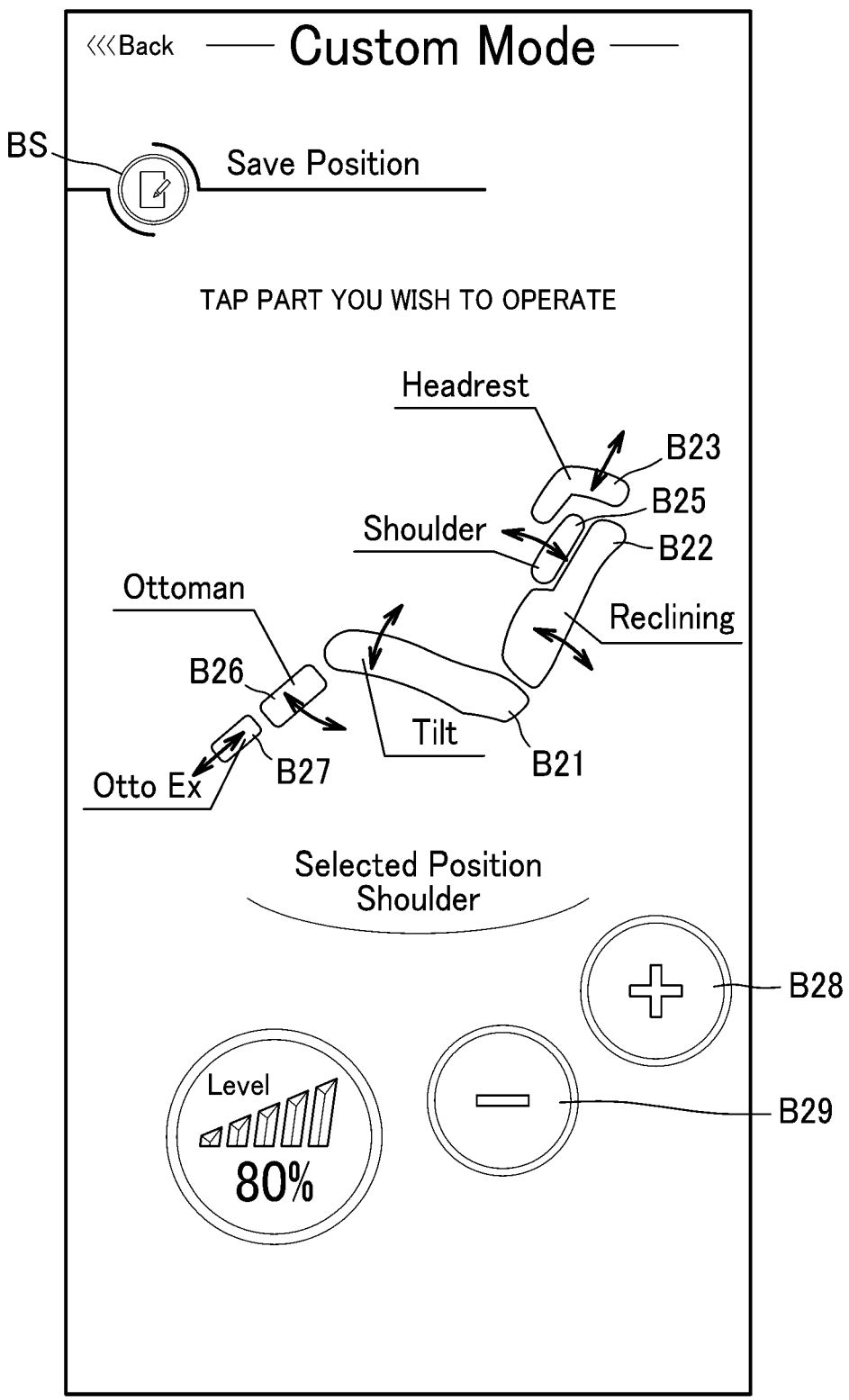
FIG. 4 is an illustration of a screen showing an image of a custom mode.

The screen shown in FIG. 3 displaying the preset mode allows the posture of the seat S to be changed to a normal position as an example of a first posture, to a lounge position, and to a relax position as an example of a second posture. The normal position is a position which makes the occupant P sit in a normal sitting posture. In the normal position, the seat cushion S1, the seat back S2, the headrest S3, the ottoman S4, and the support pad S5 are located in their respective initial positions.

The relax position is a position which makes the occupant P lie down on his/her back. In the relax position, the seat cushion S1 is located in the tilted position, the seat back S2 and the upper portion 41 of the ottoman S4 are locate in their reclined positions, the lower portion 42 of the ottoman S4 is located in the separated position, and the headrest S3 and the support pad S5 are located in their initial positions.

The lounge position is a position which allows the occupant P to read books in a relaxed posture. In the lounge position, an angle of the seat cushion S1 with respect to a horizontal plane is slightly smaller compared to that in the relax position, the seat back angle θb and the ottoman angle θo are slightly greater compared to those in the relax position, and the support pad S5 is located forward together with the headrest S3.

The smartphone SP displays, on its screen showing the preset mode, buttons B11 to B13 for selecting the respective positions, and an input window B14 for inputting a time limit to be used in a timer mode. Herein, the timer mode is a mode in which, if a position other than the normal position is selected, the seat S is caused to remain in the selected position for a set time limit, and then caused to automatically return to the normal position after lapse of the set time limit. In the timer mode, the smartphone SP outputs to the controller 100 a posture command 100 corresponding to a position other than the normal position, and then determines whether or not the time limit has elapsed. If the smartphone SP determines the time limit has elapsed, the smartphone SP outputs to the controller 100 a posture command for causing the posture of the seat S to change to the normal position.

When one of the buttons B11 to B13 is selected, the smartphone SP outputs to the controller 100 a posture command for causing the seat S to assume the posture of the position corresponding to the selected button. If either of the buttons B12, B13 is selected after a time limit is inputted into the input window B14, the smartphone SP outputs to the controller 100 a posture command corresponding to the selected button together with the time limit.

Referring back to FIG. 2, the button B2 is a button for transitioning to a custom mode which allows the occupant P to set the positions of the movable parts of the seat S according to his/her preferences. When the button B2 is selected, the smartphone SP displays on its screen an image shown in FIG. 4.

In the screen displaying the custom mode, the smartphone SP shows the movable parts of the seat S as buttons B21 to B27, a plus button B28 and a minus button B29 for increasing or decreasing an amount of movement of the movable parts, and a button BS for registering the customized position of each movable part. When one of the buttons B21 to B27 is selected, the smartphone SP highlights the selected button in contrast with the other buttons. The smartphone SP subsequently displays an amount of movement from the initial position within a range of movement of the subject movable part, in response to the operation of the buttons B28, B29, as a percentage, and then outputs to the controller 100 a signal for moving the subject movable part.

Specifically, the smartphone SP highlights the button B21 when, for example, the button B21 corresponding to the seat cushion S1 is selected. Subsequently, the smartphone SP displays, according to the number of times the buttons B28, B29 are operated or the like, the amount of movement of the seat cushion S1 from the initial position thereof as a percentage ("80%" in the example shown in FIG. 4), and transmits a signal for moving the seat cushion S1, to the controller 100, each time the buttons B28, B29 are operated. This allows the occupant P to move each movable part of the seat S to his/her preferable position while being seated on the seat S.

When the button BS is selected, the smartphone SP stores the customized positions of the movable parts as associated with identification information of the occupant P. The identification information may be input by the occupant P as appropriate after selecting the button BS, when launching the seat app, or at other occasions.

Figure 2:
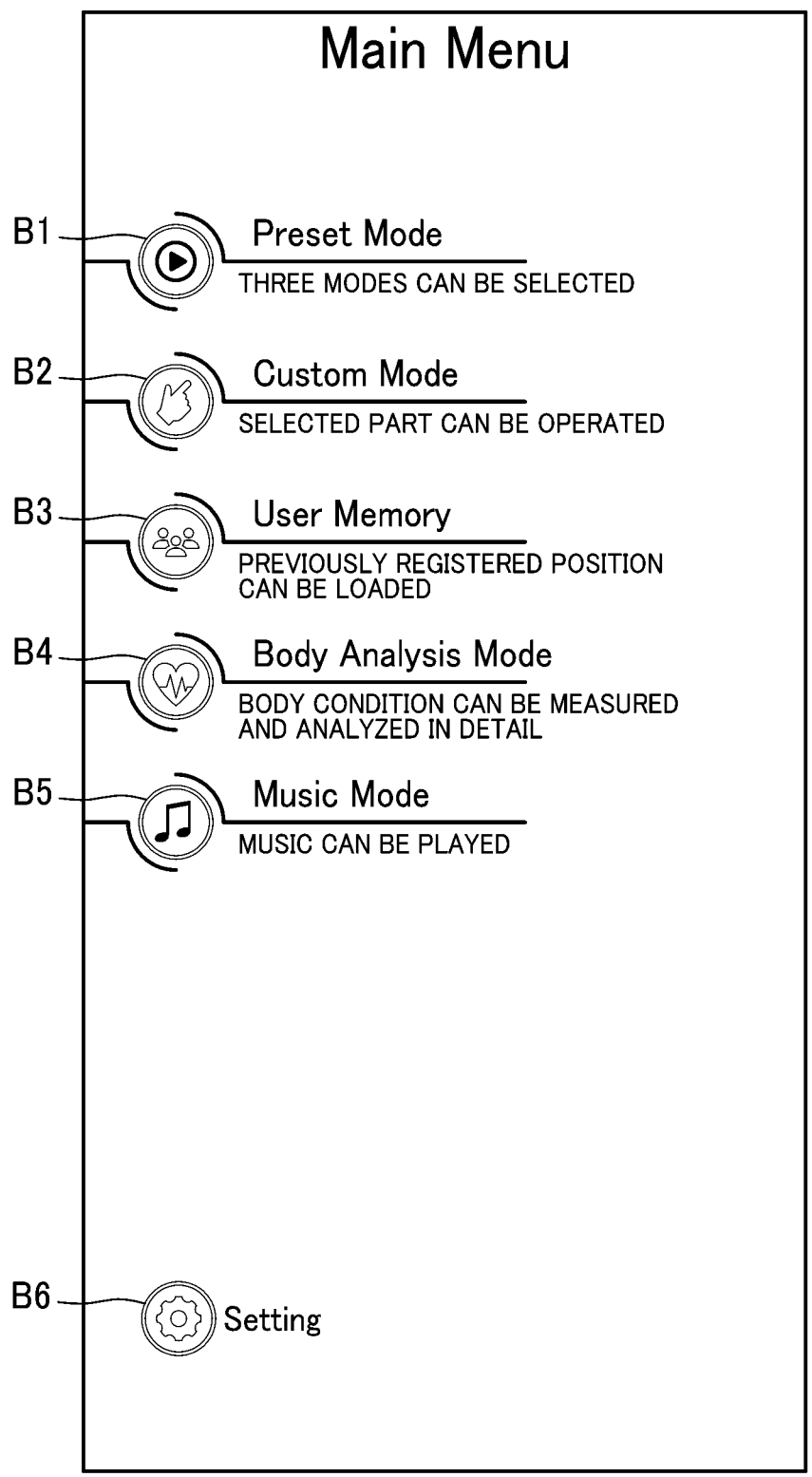
FIG. 2 is an illustration of a screen showing an image of a main menu.
Figure 5:
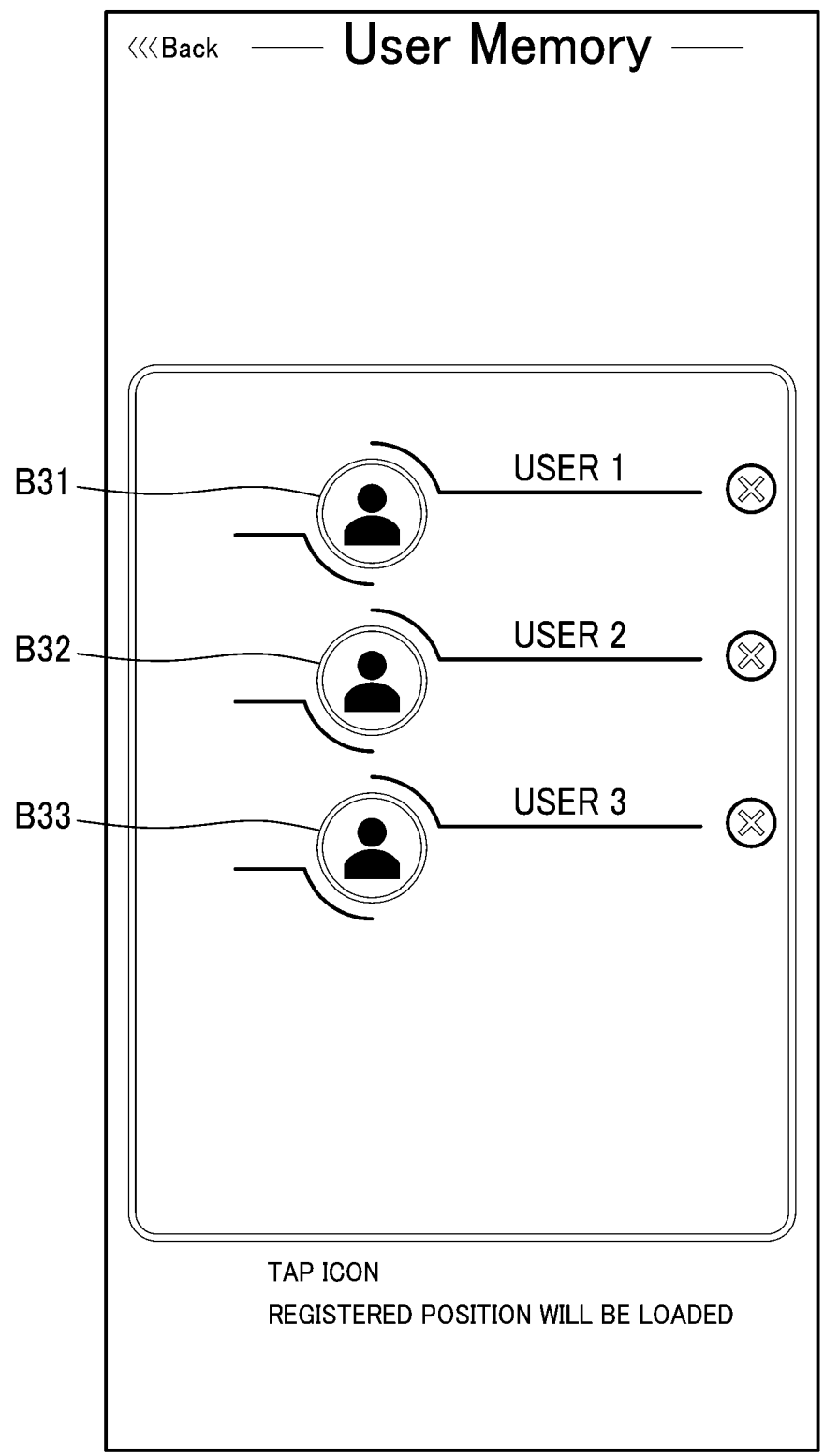
FIG. 5 is an illustration of a screen showing an image of a user memory mode.
Figure 6:
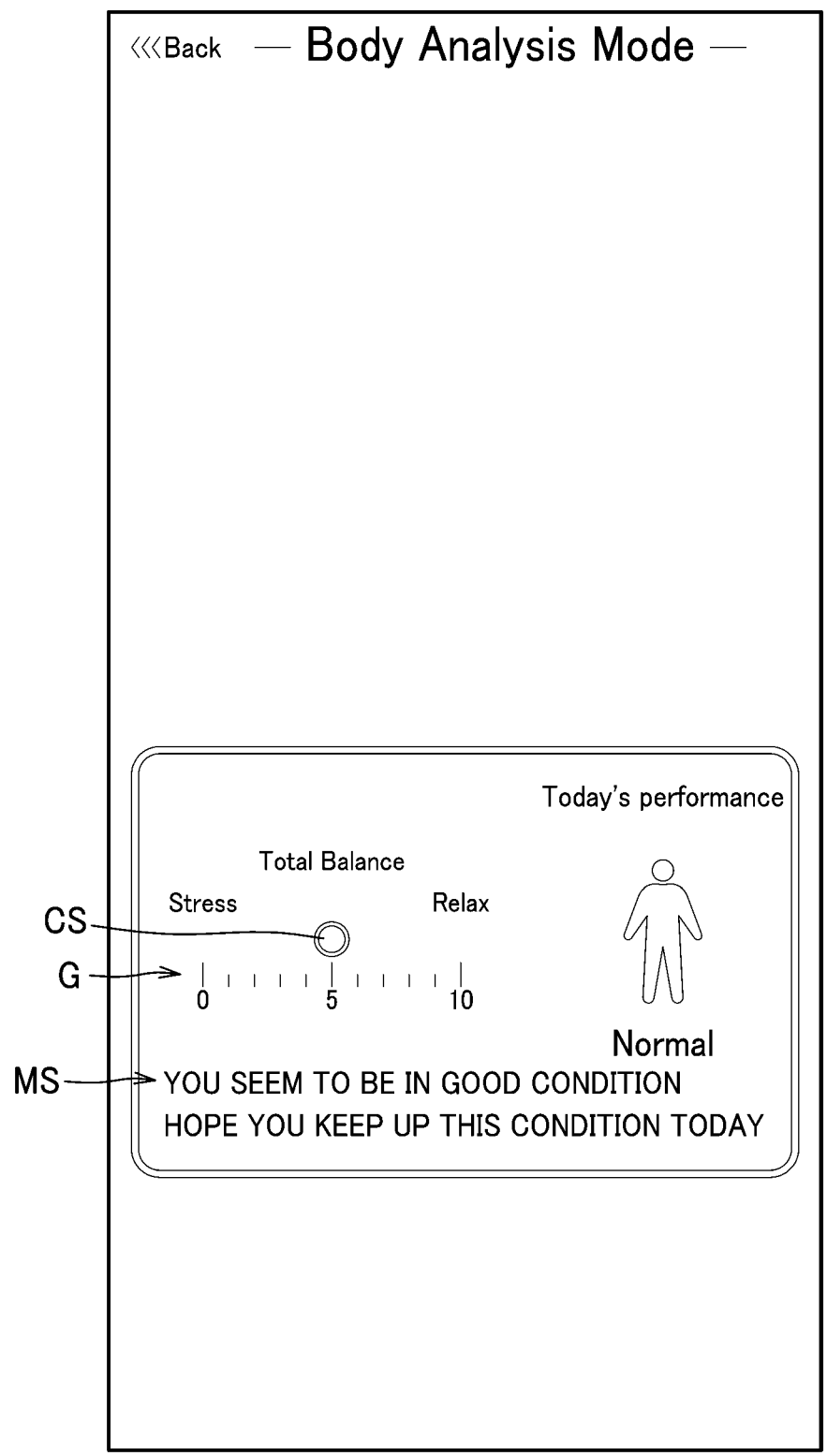
FIG. 6 is an illustration of a screen showing an image of a body analysis mode.

The thus-stored identification information associated with the customized positions of the movable parts is displayed on the screen shown in FIG. 5 showing a user memory mode. The smartphone SP displays the image shown in FIG. 5 when the button B3 of FIG. 2 is selected. The smartphone SP displays, on its screen showing the user memory mode, buttons B31 to B33 for selecting a user. When any one of buttons B31 to B33 is selected, the smartphone SP outputs to the controller 100 the positions of the movable parts set for the user corresponding to the selected button, as the posture command.

Referring back to FIG. 2, the button B4 is a button for transitioning to a body analysis mode that allows analysis of a body condition of the occupant P. When the button B4 is selected, the smartphone SP displays the image shown in FIG. 6 on its screen. The smartphone SP displays, on its screen displaying the body analysis mode, a gauge G and/or a message MS showing whether the occupant P is stressed or relaxed based on the heartbeat information. Specifically, the smartphone SP determines the position of a cursor movable within the range of the gauge G and the contents of the message MS based on the heartbeat information.

Referring back to FIG. 2, the button B5 is a button for playing music. When the button B5 is selected, the smartphone SP displays an image for music (not shown) on its screen. In the image for music, the smartphone SP displays buttons for selecting a number, a button for adjusting the volume, a button for playing music, a button for stopping playing music, etc. The smartphone SP outputs to the controller 100 the play-music command when the button for playing music is selected, and the stop-music command when the button for stopping playing music is selected.

The button B6 is a button for inputting various settings. When button B6 is selected, the smartphone SP displays an image for inputting various settings for the seat app.

Next, operation of the controller 100 will be described in detail. The controller 100 repeatedly executes a seat-posture-change process shown in FIG. 7 and a play-music process shown in FIG. 8.

Figure 7:
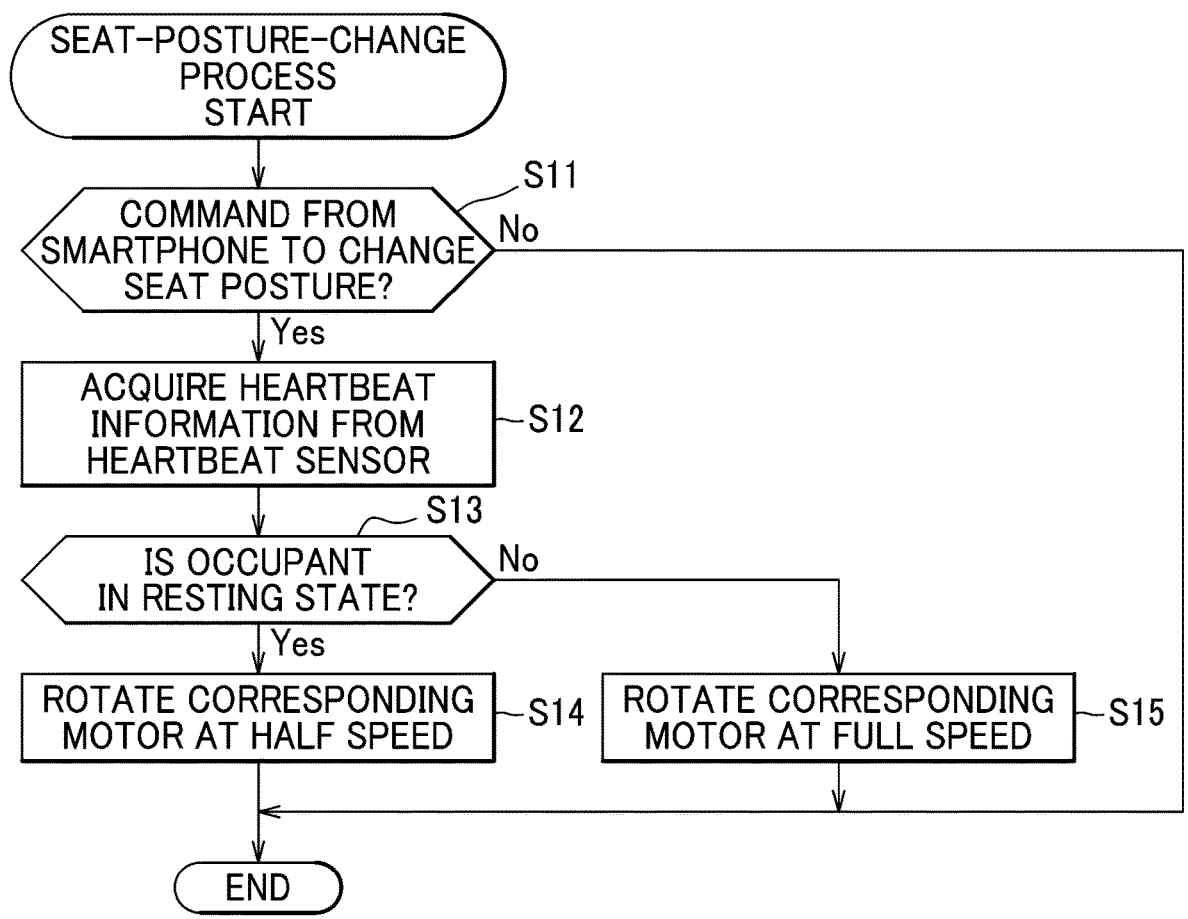
FIG. 7 is flowchart showing a seat-posture-change process.

In the seat-posture-change process shown in FIG. 7, the controller 100 first determines whether or not a posture command has been received from the smartphone SP. In more detail, the controller 100 determines whether or not the received posture command is a command for changing the present posture of the seat S (S11). Specifically, the controller 100 stores the present posture of the seat S, and determines whether or not the posture of the seat S indicated by the posture command received in step S11 is different from the presently stored posture of the seat S. If different, the controller determines Yes. The posture command received in step S11 includes the posture command outputted when the occupant P selects one of the buttons B11 to B13, and the posture command outputted when the time limit has elapsed in the timer mode.

If it is determined in step S11 that no command for changing the posture has been received (No), the controller 100 ends the present process. If it is determined in step S11 that a command for changing the posture has been received (Yes), the controller 100 acquires the heartbeat information from the heartbeat sensor 11 (S12). After step S12, the controller 100 determines, based on the heartbeat information, whether or not the occupant P is in a resting state (S13).

Herein, it may be determined that the occupant P is in the resting state, for example, if the heartbeat of the occupant P is equal to or below a predetermined value. The predetermined value, which is a threshold for the heartbeat, may be preset by the occupant P or may be set based on heartbeat information accumulated by the controller 100 so that the value corresponds to the occupant P.

If it is determined in step S13 that the occupant P is in the resting state (Yes), the controller 100 causes the motors of the drive units for the target movable parts to rotate at half speeds (S14), and ends the present process (control in a first mode). If it is determined in step S13 that the occupant P is not in the resting state (No), the controller 100 causes the motors of the drive units for the target movable parts to rotate at full speeds (S15), and ends the present process (control in a second mode). The speeds of the movable parts can thereby be made slower, when the occupant P is in the resting state, than the speeds of the movable parts when the occupant P is not in the resting state.

In this example, the motors are rotated at full speeds in step S15, and rotated at half speeds which are half the full speeds in step S14. However, the rotation speed of each motor in step S14 may be any speed as long as it is slower than the rotation speed of the corresponding motor in step S15.

Figure 8:
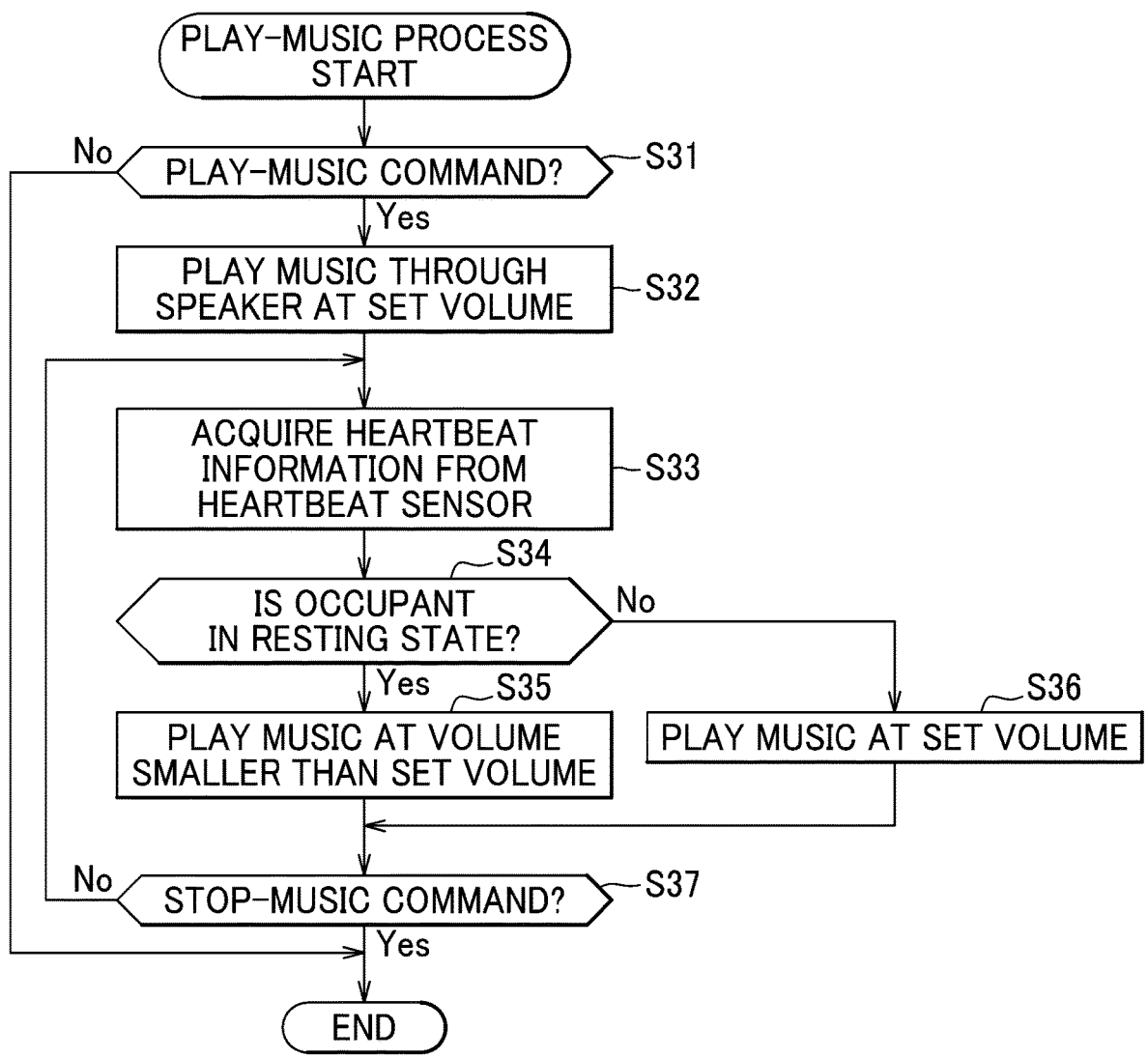
FIG. 8 is a flowchart showing a play-music process.

In the play-music process shown in FIG. 8, the controller 100 first determines whether or not the play-music command has been received (S31). If it is determined in step S31 that the play-music command has not been received (No), the controller 100 ends the present process.

If it is determined in step S31 that the play-music command has been received (Yes), the controller 100 causes music to be played through the speaker 15 at a set volume (S32). After step S32, the controller 100 acquires the heartbeat information from the heartbeat sensor 11 (S33).

After step S33, the controller 100 determines whether or not the occupant P is in the resting state based on the heartbeat information (S34). If it is determined in step S34 that the occupant P is in the resting state (Yes), the controller 100 causes music to be played at a volume smaller than the set volume (S35). In other words, if it is determined in step S34 that the occupant P is in the resting state, the controller 100 turns down the volume of the speaker 15 to a volume lower than a volume at which music is played when it is determined that the occupant P is not in the resting state (control in the first mode).

If it is determined in step S34 that the occupant P is not in the resting state (No), the controller 100 causes music to be played at the set volume (S36). In more detail, when the process of step S36 is executed, the controller 100 does not change the volume if the present volume is the set volume, but turns up the volume to the set volume if the present volume had been turned down in step S35 (control in the second mode).

After step S35 or after step S36, the controller 100 determines whether or not the stop-music command has been received (S37). If it is determined that the stop-music command has not been received (No), the controller 100 returns to the process of step S33. If it is determined in step S37 that the stop-music command has been received (Yes), the controller 100 ends the present process.

Next, an example of the operation of the controller 100 will be described in detail.

As shown in FIG. 1, when the occupant P seated on the seat S in the normal position launches the seat app in his/her smartphone, the image of the main menu shown in FIG. 2 is displayed on the screen. If the occupant P selects the button B1 of the preset mode on the screen, the image shown in FIG. 3 is displayed on the screen. If the occupant P selects the button B13 on the screen, the smartphone SP outputs to the controller 100 a posture command for changing the posture of the seat S to a relax position.

If a posture command for changing the posture of the seat S to the relax position is received, the controller 100 determines Yes in step S11 shown in FIG. 7, acquires the heartbeat information from the heartbeat sensor 11 (S12), and determines whether or not the occupant P is in the resting state (S13). If it is determined in step S13 that the occupant P is not in the resting state (No), the controller 100 causes the motors of the drive units M1, M2, the rotation device M41, and the lifting and lowering device M42 to rotate at full speeds (control in the second mode). This causes the seat cushion S1 to move to the tilted position, the seat back S2 and the upper portion 41 of the ottoman S4 to move to the reclined position, and the lower portion of the ottoman S4 to move to the separated position at relatively fast predetermined speeds, so that the posture of the seat S can be promptly changed from the normal position to the relax position.

If the occupant P seated on the seat S in the relax position selects the button B5 of the main menu shown in FIG. 2 and then pushes a play-music button (not shown), the smartphone SP outputs the play-music command to the controller 100. When the play-music command is received, the controller 100 determines Yes in step S31 and causes music to be played through the speaker 15 at the set volume (S32).

If the body condition of the occupant P does not assume the resting state for a given time period after the posture of the seat S has changed to the relax position, the controller 100 repeatedly executes the processes of step S34: No→step S36→step S37: No→step S33 (control in the second mode). This allows the occupant P to listen to music at a volume he/she has set by himself/herself.

If the given time period has elapsed after the posture of the seat S changed to the relax position, and the body condition of the occupant P assumes the resting state, the controller 100 determines Yes in step S34, and turns down the volume of the speaker 15 (S35) (control in the first mode). This allows the occupant P in the resting state to feel further relaxed by the volume of the speaker 15 being turned down so that the occupant P, for example, can take a nap on the seat S.

If the occupant P in the resting state selects the button B11 in the preset mode shown in FIG. 3, the smartphone SP outputs to the controller 100 a posture command for changing the posture of the seat S to the normal position. If the posture command for changing the posture of the seat S to the normal position is received, the controller 100 determines Yes in step S11 shown in FIG. 7, acquires the heartbeat information from the heartbeat sensor 11 (S12), and determines whether or not the occupant P is in the resting state (S13).

Since the occupant P is in the resting state at this point in time, the controller 100 determines in step S13 that the occupant P is in the resting state (Yes), and causes the motors of the drive units M1, M2, the rotation device M41, and the lifting and lowering device M42 to rotate at half speeds (control in the first mode). This causes the seat cushion S1, the seat back S2, and the upper portion 41 and the lower portion 42 of the ottoman S4 to move to their initial positions at speeds lower than their predetermined speeds, and thus allows the posture of the seat S to be changed from the relax position to the normal position while keeping the occupant P in the resting state, i.e., sustaining the resting state of the occupant P.

According to the above-described example, the following advantageous effects can be obtained.

Since the speeds of the movable parts of the seat S are made slower if the occupant P is in the resting state, it is possible to sustain the resting state of the occupant P. Particularly, if the occupant P is in the resting state when the posture of the seat S is changed from the relax position to the normal position, i.e., when the seat back S2 is moved up, the seat back S2 can be moved up at slower speeds, so that the resting state of the occupant P can be sustained. Similarly, if the occupant P is in the resting state when the posture of the seat S is changed from the relax position to the normal position, i.e., when the ottoman S4 is rotated downward, the ottoman S4 can be moved downward at slower speeds, so that the resting state of the occupant P can be sustained.

Since the volume of the speaker 15 is turned down if the occupant P is in the resting state, the resting state of the occupant P can be sustained.

The seat experience system of the above-described first example may be appropriately modified and implemented as shown in other examples described below. In the following description, the same reference characters are used to identify structures and/or processes similar to those of the above-described example and explanation thereof will be omitted.

Although the speed of the movable part is changed based on whether or not the occupant P is in the resting state in the above-described example, the amount of movement of the movable part may be changed based on whether or not the occupant P is in the resting state. In this case, the controller 100 may be configured to execute a seat-posture-change process shown in, for example, FIG. 9.

Figure 9:
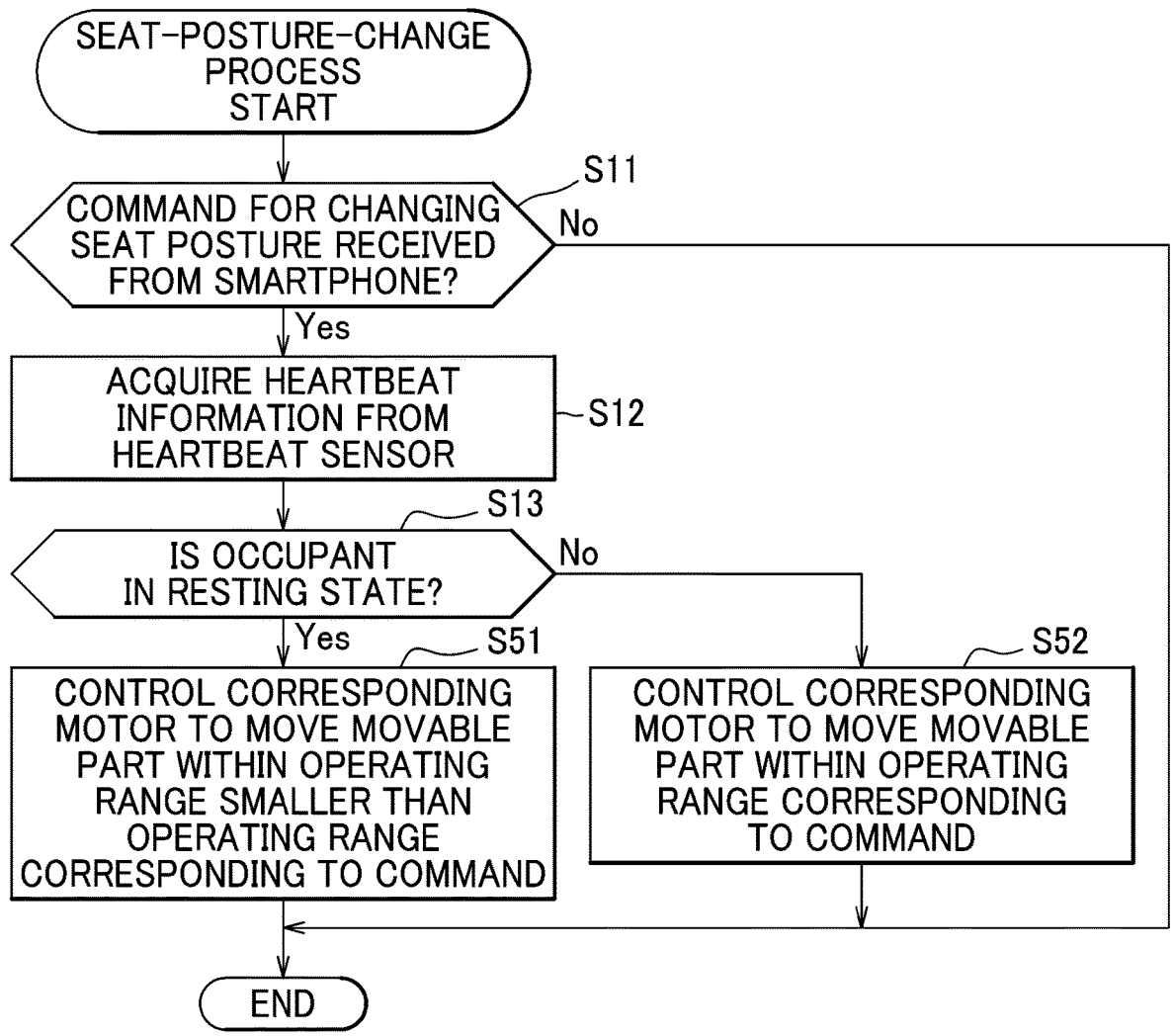
FIG. 9 is a flowchart showing a modified example of the seat-posture-change process.

The seat-posture-change process shown in FIG. 9 is a process in which the steps S14, S15 of the seat-posture-change process shown in FIG. 7 are replaced with new steps S51, S52. If it is determined in step S13 that the occupant P is in the resting state (Yes), the controller 100 executes the process of step S51, and if it is determined in step S13 that the occupant P is not in the resting state (No), the controller 100 executes the process of step S52.

In step S51, the controller 100 controls the motors in such a manner that the movable parts move within operating ranges smaller than operating ranges corresponding to the posture command (control in the first mode). In step S52, the controller 100 controls the motors in such a manner that the movable parts move within operating ranges corresponding to the posture command (control in the second mode).

Specifically, if step S52 is executed when the posture command includes, for example, a command to rotate the seat back S2 from the initial position to the reclined position, the controller 100 causes the motor of the drive unit M2 to rotate for a predetermined time period, so that the seat back S2 rotates from the initial position to the reclined position. On the other hand, if step S51 is executed when the posture command includes a command to rotate the seat back S2 from the initial position to the reclined position, the controller 100 causes the motor of the drive unit M2 to rotate for a period of time shorter than the predetermined time period, so that the seat back S2 rotates from the initial position to an intermediate position located between the initial position and the reclined position.

According to this configuration, since the amount of movement of the movable part becomes smaller when the occupant P is in the resting state, the resting state of the occupant P can be sustained.

Although the heartbeat sensor 11 is given as an example of the sensor in the above-described example, the sensor can be any kind of sensor as long as it is capable of acquiring biogenic information for determining whether or not the occupant P is in the resting state. If the pulse of the occupant can be detected by a pressure sensor for detecting the weight of the occupant, the sensor may comprise the pressure sensor.

Although the resting state is determined when the posture of the seat S is changed among various postures in the above-described example, the resting state may only be determined when the posture of the seat S is changed, for example, from the relax position (second posture) to the normal position (first posture), and the resting state may not be determined in other cases (for example, when the posture of the seat S is changed from the first posture to the second posture).

Although the seat S is configured to comprise the controller 100 in the above-described example, the controller may be configured separate from the seat.

The sound produced by the speaker is not limited to music and may, for example, be news read on a radio program, rakugo (traditional Japanese comic storytelling), or other sounds and/or voices.

The seat may be a car seat installed in an automobile. The seat may also be a seat installed in a vehicle other than an automobile, for example, a train, a ship, an airplane, etc. Further, the seat is not limited to a vehicle seat and may, for example, be a seat used at home or other places.

The terminal used to transmit commands to the controller is not limited to the smartphone SP, and may be any terminal as long as it has a screen.

If the seat is a car seat installed in an automobile, the seat may be movable in the front-rear direction by a forward/rearward slide mechanism, and the display showing the seat arrangement patterns (the normal position, the lounge position, and the relax position shown in FIG. 3) on the screen of the smartphone SP may be changed according to the position of the seat in the front-rear direction. Specifically, if the seat is located at the forwardmost position, the display of FIG. 3 may only show the normal position because the ottoman S4 cannot be rotated forward. If the seat is located a little rearward of the forwardmost position, i.e., if the ottoman S4 can be moved to a position corresponding to the lounge position, the display of FIG. 3 may only show the normal position and the lounge position. Further, if the seat is located at the rearwardmost position, all of the positions, i.e., the normal position, the lounge position, and the relax position may be displayed.

The seat experience system may comprise a plurality of seats. In this case, the seat experience system may be configured such that biogenic information of a second user acquired by a sensor of a second seat is displayed on a screen of a first smartphone of a first user seated on a first seat. Further, the first smartphone may output a posture command to a second controller of the second seat so that the first user can move movable parts of the second seat.

If a passenger seat of an automobile is the second seat and a seat behind the passenger seat is the first seat, a first controller of the first seat may be capable of acquiring information from a position sensor for acquiring a position of the second seat in the front-rear direction, and a pressure sensor for detecting whether an occupant is seated on the second seat, and capable of controlling a forward/rearward movement device for moving the second seat forward or rearward. In this case, for example, the first controller may be configured such that if a command to change the posture of the first seat to the relax position is provided from the first smartphone to the first controller, the first controller determines the position of the second seat in the front-rear direction and whether an occupant is seated on the second seat, and if it is determined that the second seat is located in a rearwardmost position and an occupant is not seated on the second seat, the second seat is moved forward. Further, the first controller may be configured such that if a command to change the posture of the first seat to the relax position is provided from the first smartphone to the first controller, the first controller controls the in-car lighting, sound, etc. to form an easy-to-relax environment.

The timer mode may be configured to be selectable only when the posture of the seat S is the relax position. Further, in a car in which a car navigation process is being executed, the seat experience system may be configured to cause the seat to automatically return from the relax position to the normal position during execution of the timer mode even if the time limit of the timer mode has not elapsed, on the condition that a distance to a destination becomes shorter than a predetermined distance, and a sleep state of the occupant becomes a conscious state.

Herein, a method described in Japanese Patent Application laid-open Publication No. 2017-80297 may be used to determine the sleep state. Specifically, this method comprises acquiring respiratory data of an occupant via a respiratory sensor, computing a degree of change per time unit (P_vel) of the respiratory data (pressure signal) based on the acquired respiratory data, and determining whether or not the occupant is in the conscious state by defining the probability, as a likelihood that the occupant will get drowsy for P_vel, and using a Bayes filter that multiplies the likelihood by a prior probability that the occupant will get drowsy. The respiratory sensor may be a pressure sensor that acquires values of pressure from the occupant, or a radio wave sensor that emits radio waves toward the occupant.

The respiratory sensor may be used in combination with a brain-wave sensor for detecting brain waves of the occupant to determine the sleep state of the occupant. Specifically, it may be determined that the occupant has become conscious if it is determined based on the respiratory sensor that the occupant has become conscious, and it is determined that amplitudes of brain waves of the occupant have become lower than a predetermined threshold.

The respiratory sensor may be used in combination with a pressure sensor to determine the sleep state of the occupant. Specifically, it may be determined that the occupant has become conscious if it is determined based on the respiratory sensor that the occupant has become conscious, and a body motion greater than a predetermined amount is observed by the pressure sensor, i.e., an amount of change of a pressure value is equal to or greater than a predetermined value.

The elements described in the above example embodiment and its modified examples may be implemented selectively and in combination.

A detailed description will be given of a second example of a seat experience system with reference to FIGS. 10 to 16.

Figure 10:
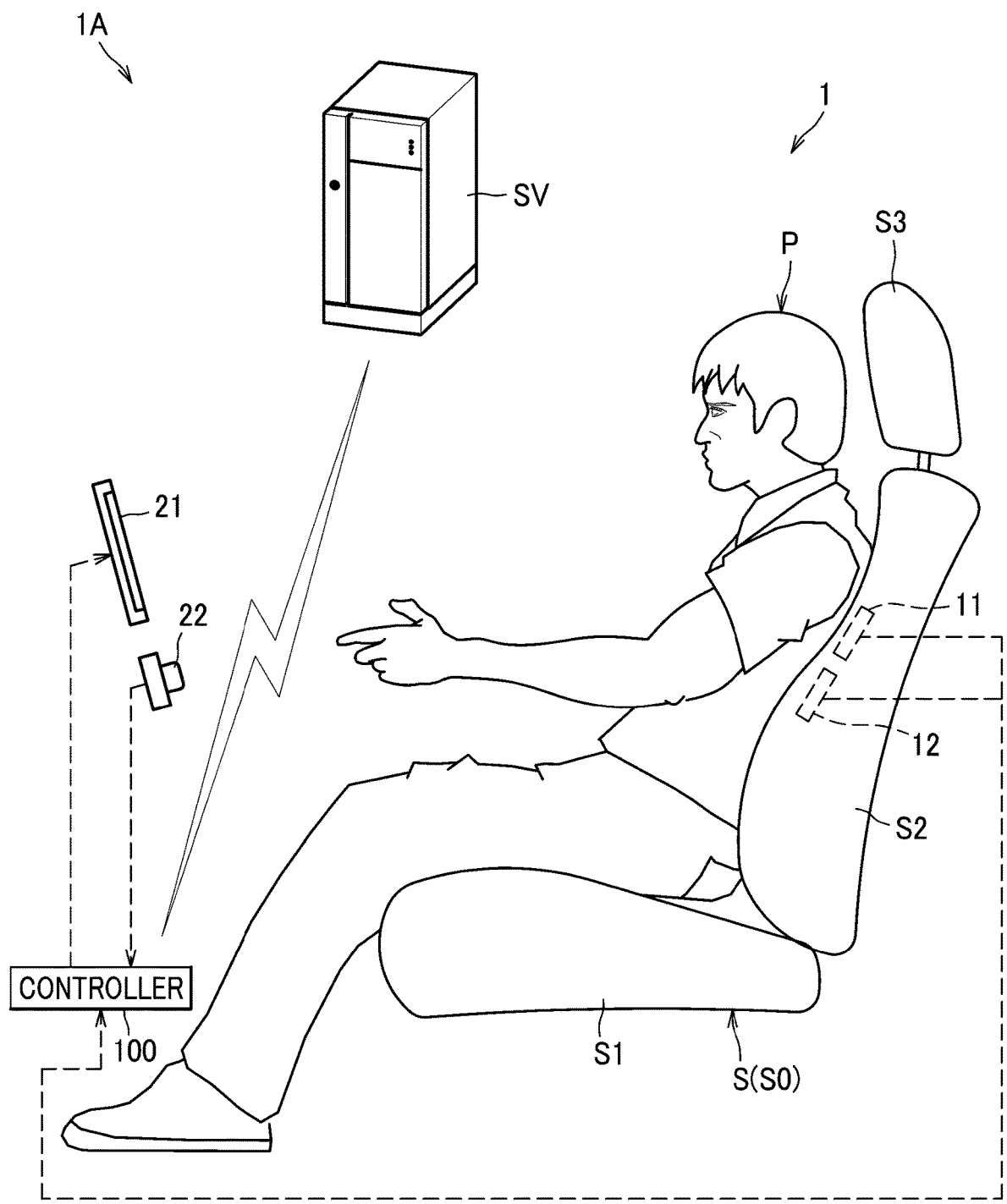
FIG. 10 is an illustration of a seat experience system according to a second example.

As shown in FIG. 10, the seat experience system 1A comprises a seat S, a controller 100, and a server SV. The seat S is configured as, for example, a car seat to be installed in a car as an example of a vehicle.

The seat S comprises a seat body S0 installed in a car, a heartbeat sensor 11 and a respiratory sensor 12 as examples of a sensor. The seat body S0 comprises a seat cushion S1, a seat back S2, and a headrest S3. The seat cushion S1, the seat back S2, and the headrest S3 each comprise a cushion pad and an outer covering with which the cushion pad is covered.

The heartbeat sensor 11 is a sensor for acquiring heartbeat information which is biogenic information of an occupant P seated on the seat body S0. The heartbeat sensor 11 is located on a backside of the outer covering of the seat back S2.

The respiratory sensor 12 is a sensor for acquiring respiratory information which is biogenic information of the occupant P. The respiratory sensor 12 is located on a backside of the outer covering of the seat back S2.

The car comprises a monitor 21 that can display a screen for navigating the car, and a drive-mode-switch button 22 for starting or ending an autonomous drive mode of the car. The drive-mode-switch button 22 is configured, for example, to output a start signal for starting the autonomous drive mode if pushed when the car is not in the autonomous drive mode, and to output an end signal for ending the autonomous drive mode if pushed during the autonomous drive mode.

Figure 11A:
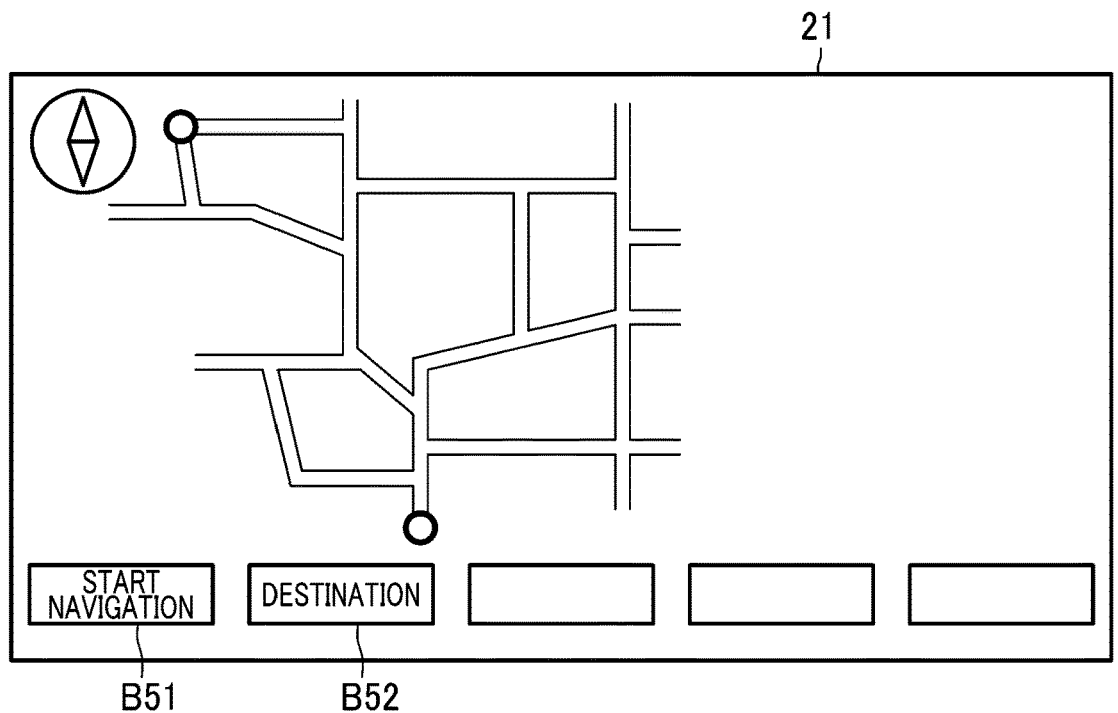
FIG. 11A is an illustration of a car navigation screen.
Figure 11B:
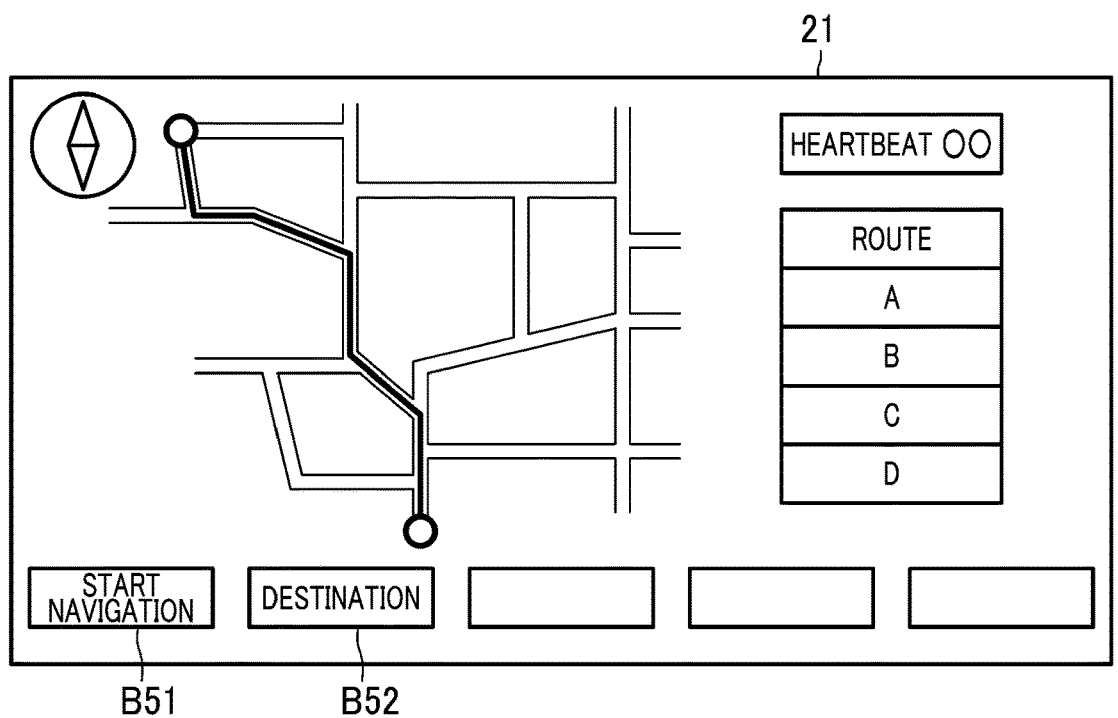
FIG. 11B is an illustration of a screen for allowing an occupant to select a route from a plurality of routes.

The controller 100 comprises a central processing unit (CPU), a read-only memory (ROM), a random-access memory (RAM), a rewritable nonvolatile memory, etc. (not shown), and has a function of executing pre-stored programs. Specifically, the controller 100 is capable of executing a navigation process for navigating the car to a destination according to a route set by the occupant P. The route is set by the occupant P operating various operation buttons on the monitor 21, as shown in FIGS. 11A, 11B.

Specifically, if the occupant P presses the destination button B52 on the monitor 21, the controller 100 causes a screen (not shown) for setting the destination to be displayed on the monitor 21. If the occupant P sets the destination, the controller 100 causes, as shown in FIG. 11B, a plurality of routes to be displayed on the monitor 21 based on the current location of the car and the destination. If the occupant P selects a route from the plurality of routes and presses a start-navigation button B51, the controller 100 starts navigation according to the route set by the occupant P.

Figure 12A:
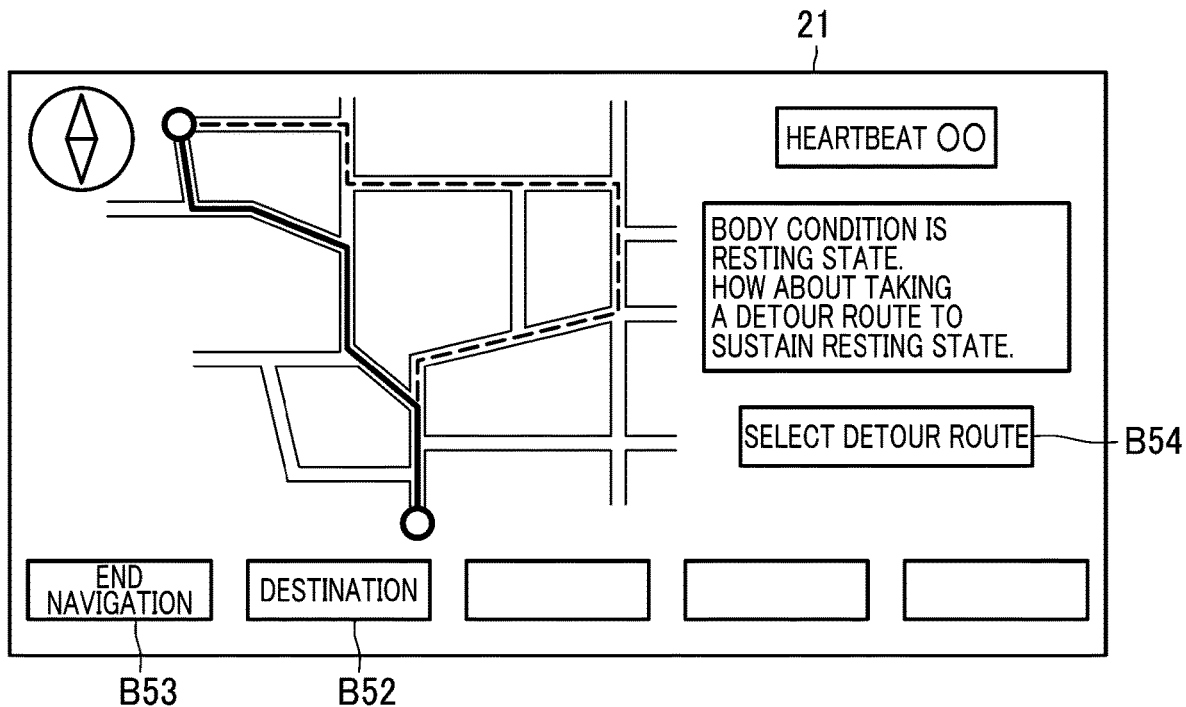
FIG. 12A is an illustration of a screen for presenting a detour route to the occupant.

After navigation starts, the controller 100 causes an end-navigation button B53 shown in FIG. 12A to be displayed instead of the start-navigation button B51. If the end-navigation button B53 is pressed, or the car arrives at the destination, the controller 100 ends the navigation process.

The controller 100 is capable of acquiring biogenic information from the heartbeat sensor 11 and the respiratory sensor 12, and acquiring a signal from the drive-mode-switch button 22 to start or end the autonomous drive mode. The controller 100 executes various processes based on the acquired information and signal.

The signal outputted from the drive-mode-switch button 22 is acquired by the Electronic Control Unit (ECU) (not shown), and the ECU executes autonomous drive control to drive the car in an autonomous mode. During autonomous drive control, the ECU uses, for example, a sensor such as a camera installed on the car to execute a process of driving the car so that the car does not go off a driving lane, a process of maintaining the distance between the car and a car running in front of the car equal to or above a predetermined value, and other processes. In the present example, the ECU executes autonomous drive control in response to the signal from the drive-mode-switch button 22 only while the car is being driven on an expressway.

Figure 12B:
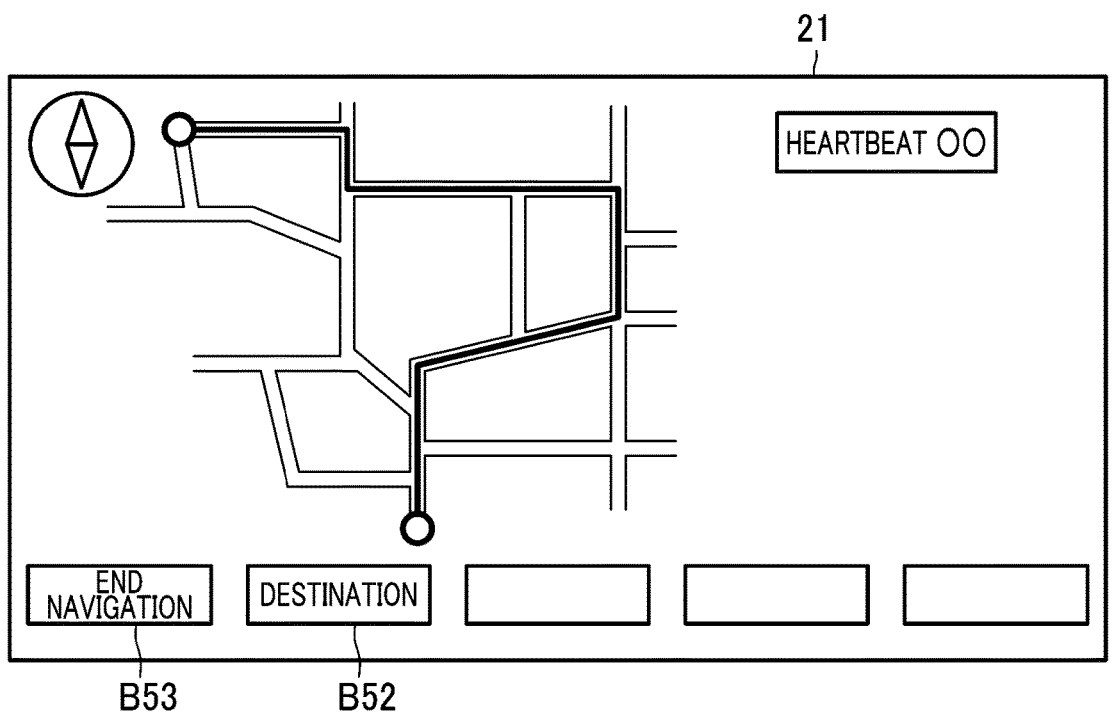
FIG. 12B is an illustration of a screen shown when the occupant selects the detour route.

As shown in FIGS. 12A, 12B, the controller 100 has a function of presenting, during the navigation process while navigating the car along the route set by the occupant P, a route with a driving distance longer than that of the route set by the occupant P if it is determined that the occupant P is in the resting state based on the heartbeat information. Herein, a method of determining whether or not the occupant P is in the resting state includes, for example, a method that determines the occupant P is in the resting state if the heartbeat of the occupant is equal to or below a predetermined value. It is to be understood that the predetermined value, which is a threshold value for the heartbeat, may be preset by the occupant P, or set based on heartbeat information accumulated in the server SV by the controller 100 such that the value corresponds to the occupant P.

Figure 13A:
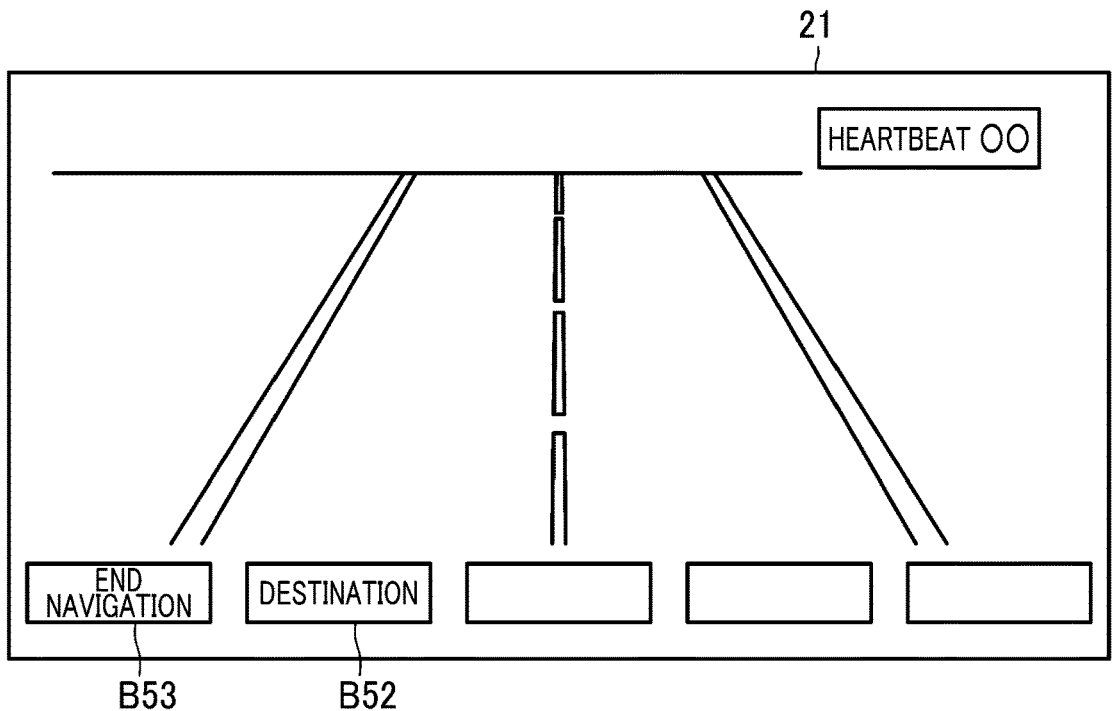
FIG. 13A is an illustration of a screen shown when a car is being driven in an autonomous drive mode on an expressway.
Figure 13B:
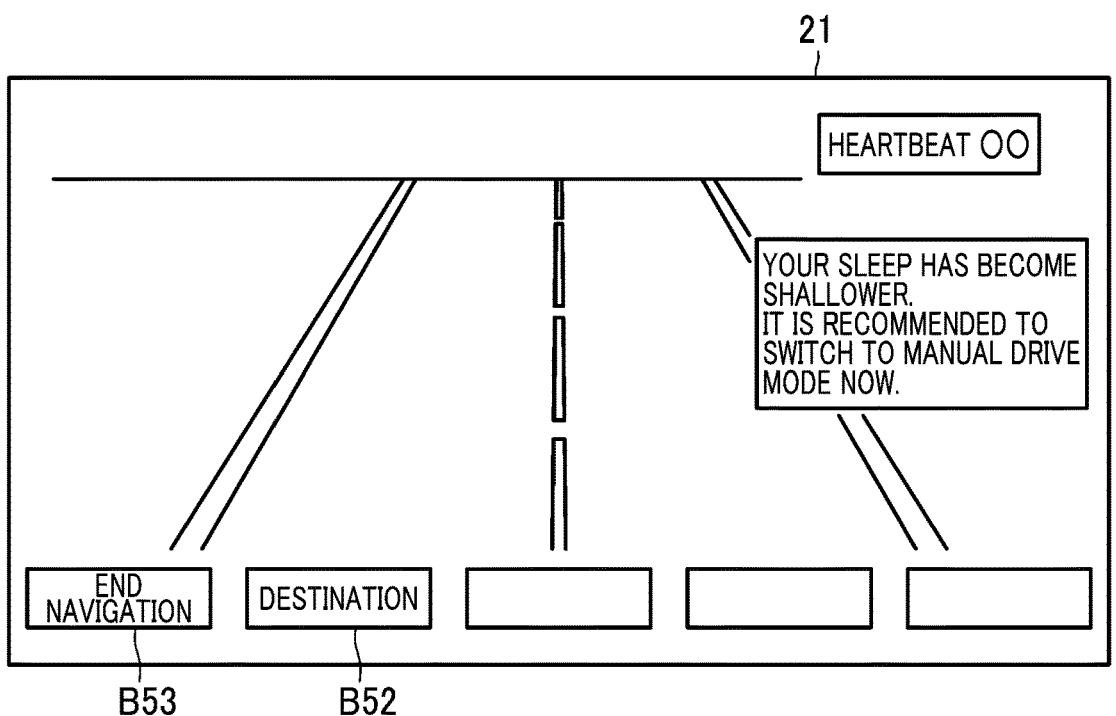
FIG. 13B is an illustration of a screen presenting a proposal to the occupant for switching to a manual drive mode.

The controller 100 is capable of discriminating sleep states of the occupant, based on the respiratory information, between a first sleep state and a second sleep state shallower than the first sleep state, i.e., having a quality of sleep lower than that of the first sleep state. Herein, the method described in Japanese Patent Application laid-open Publication No. 2017-80297 may be used to determine the sleep state. Specifically, this method comprises acquiring respiratory data of the occupant from a respiratory sensor, computing a degree of change per time unit (P_vel) of the respiratory data (pressure signal) based on the acquired respiratory data, and determining whether or not the occupant is in a conscious state by defining the probability, as a likelihood, that the occupant will get drowsy for P_vel, and using a Bayes filter that multiplies the likelihood by a prior probability that the occupant will get drowsy. The controller 100 using this method is capable of determining that the occupant P is in the second sleep state when it is determined that the occupant P is in the conscious state, and that the occupant is in the first sleep state when it is determined that the occupant P is in states other than the conscious state. The controller 100 has a function of presenting, as shown in FIG. 13A, 13B, a proposal for switching to a manual drive mode if the sleep state of the occupant becomes the second sleep state while the vehicle is being driven in an autonomous drive mode.

The controller 100 is capable of communicating with the server SV, and has a function of transmitting the biogenic information acquired from the heartbeat sensor 11 and the respiratory sensor 12 to the server SV together with identification information of the occupant P. Herein, the identification information may be manually input by the occupant P via, for example, a setting screen displayed on the monitor 21. The server SV has a function of accumulating the biogenic information transmitted from the controller 100 together with the identification information.

The controller 100 also has a function of displaying the biogenic information acquired from the heartbeat sensor 11 (see FIGS. 11B, 13A, etc.) to provide a notification of the biogenic information to the occupant P.

Next, operation of the controller 100 will be described in detail. The controller 100 is capable of executing the navigation process shown in FIG. 14, and a sleep-state-determination process shown in FIG. 15 which is a process preformed during autonomous drive control.

Figure 14:
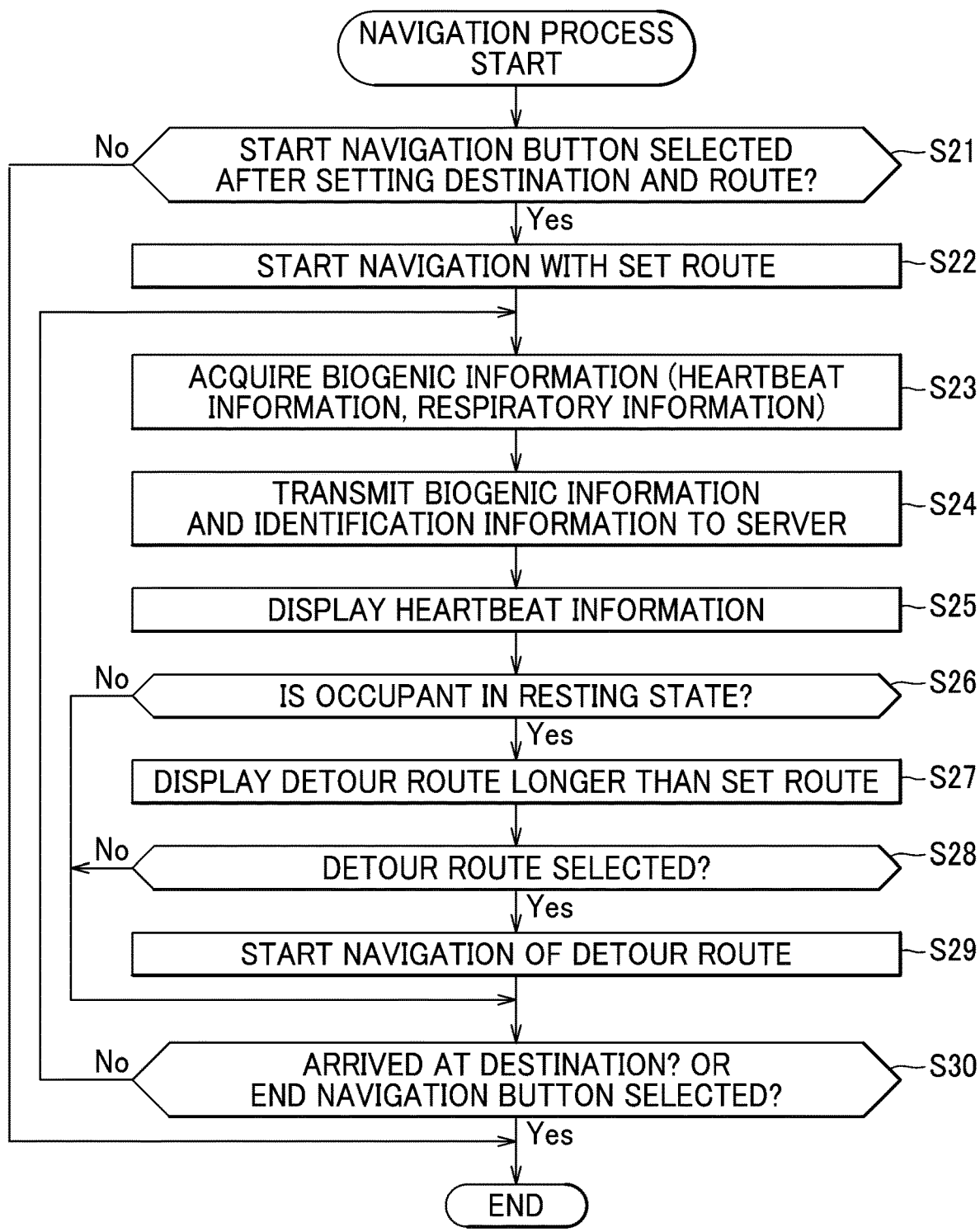
FIG. 14 is a flowchart showing a navigation process.

In the navigation process shown in FIG. 14, the controller 100 first determines whether or not the destination and route has been set and the start-navigation button B51 has been pressed by the occupant P (S21). If it is determined in step S21 that the start-navigation button B51 has not been pressed (No), the controller 100 ends the present process.

If it is determined in step S21 that the start-navigation button B51 has been pressed (Yes), the controller 100 starts navigation based on the route set by the occupant P (S22). After step S22, the controller 100 acquires the biogenic information from the heartbeat sensor 11 and the respiratory sensor 12 (S23), and transmits the biogenic information to the server SV together with the identification information (S24).

After step S24, the controller 100 causes the heartbeat information acquired in step S23 to be displayed on the monitor 21 (S25). After step S25, the controller 100 determines, based on the heartbeat information, whether or not the occupant P is in the resting state (S26).

If it is determined in step S26 that the occupant is in the resting state (Yes), the controller 100 executes control in the first mode. Specifically, the controller 100 causes a detour route longer than the route set by the occupant P to be displayed on the monitor 21 (S27). After step S27, the controller 100 determines whether or not the detour route has been selected by the occupant P (S28).

If it is determined in step S28 that the detour route has been selected (Yes), the controller 100 starts navigation of the detour route (S29). After step S29, or if it is determined No in step S26 or step S28, the controller 100 determines whether or not a first condition that the car has arrived at the destination, or a second condition that the end-navigation button B53 has been pushed is satisfied (S30).

If it is determined in step 30 that neither the first condition nor the second condition is satisfied (No), the controller 100 returns to the process of step S23. If it is determined that the first condition or the second condition is satisfied in step S30 (Yes), the controller 100 ends the present process.

Figure 15:
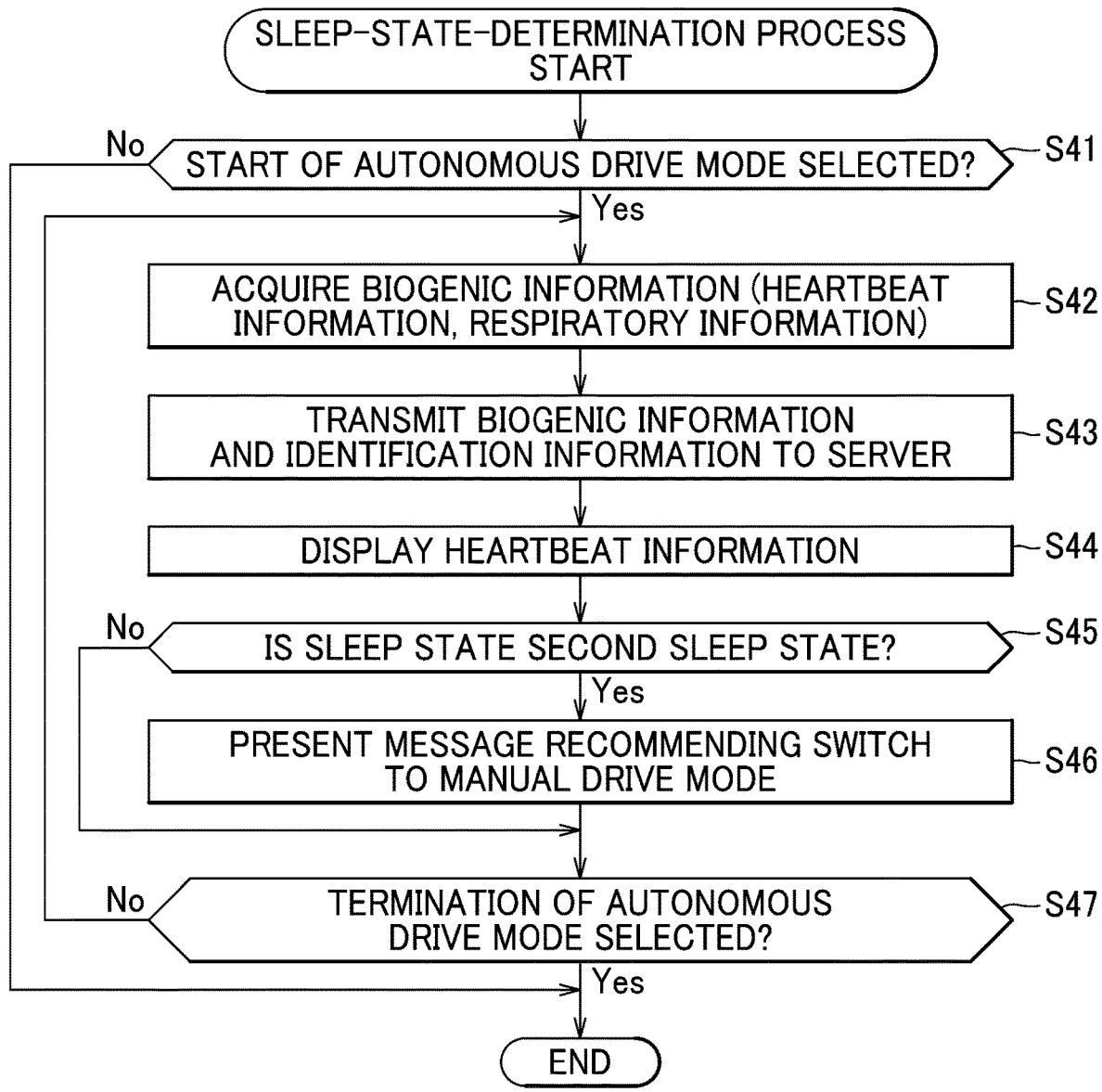
FIG. 15 is a flowchart showing a sleep-state-determination process.

In the sleep-state-determination process shown in FIG. 15, the controller 100 first determines, based on the signal from the drive-mode-switch button 22, whether or not start of the autonomous drive mode has been selected by the occupant P (S41). If it is determined in step S41 that start of the autonomous drive mode is not selected (No), the controller 100 ends the present process.

If it is determined in step S41 that start of the autonomous drive mode has been selected (Yes), the controller 100 acquires the biogenic information from the heartbeat sensor 11 and the respiratory sensor 12 (S42), and transmits the biogenic information to the server SV together with the identification information (S43). After step S43, the controller 100 causes the heartbeat information acquired in step S42 to be displayed on the monitor 21 (S44).

After step S44, the controller 100 determines, based on the respiratory information, whether or not the sleep state of the occupant P is the second sleep state (S45). If it is determined in step S45 that the sleep state is the second state (Yes), the controller 100 presents a message recommending switching of the drive mode to the manual drive mode.

Specifically, in step S46, the controller 100 causes a message to be displayed on the monitor 21 and causes the speaker to produce a voice corresponding to the message or a sound such as an alarm to wake up the occupant P. A vibration device provided on the seat S may be caused to vibrate instead of causing the speaker to produce a sound. Further, sounds and vibrations may be provided in combination.

After step S46 or if it is determined No in step S45, the controller 100 determines, based on the signal from the drive-mode-switch button 22, whether or not termination of the autonomous drive mode has been selected (S47). If it is determined in step S47 that termination of the autonomous drive mode has not been selected (No), the controller 100 returns to the process of step S42. If it is determined in step S47 that termination of the autonomous drive mode has been selected (Yes), the controller 100 ends the present process.

Next, an example of the operation of the controller 100 will be described in detail.

As shown in FIG. 11A, if the occupant P presses the destination button B52 on the monitor 21, the controller 100 causes the screen for setting the destination (not shown) to be displayed on the monitor 21. If the occupant P sets the destination, the controller 100 causes a plurality of routes to be displayed on the monitor 21, as shown in FIG. 11B, based on the current location of the car and the destination. If the occupant P selects a route from the plurality of routes and presses the start-navigation button B51, the controller 100 starts navigation according to the route set by the occupant P and causes the heart rate of the occupant P to be displayed on the monitor 21.

During the navigation process, the controller 100 determines whether or not the occupant P is in the resting state based on the heartbeat information. If it is determined that the occupant P is in the resting state, the controller 100 executes control in the first mode. Specifically, the controller 100 causes, as shown in FIG. 12A, a message encouraging the occupant P to take the detour route and a selection button B54 for selecting the detour route to be displayed on the monitor 21. Specifically, a message such as "Body condition is resting state. How about taking a detour route to sustain resting state." is displayed on the monitor 21. The controller 100 may be configured to cause the speaker to produce a voice corresponding to the message or a sound such as a notification sound when the message is displayed.

If the occupant P encouraged by the message wishes to sustain the resting state and presses the selection button B54, the controller 100 starts navigation of the detour route as shown in FIG. 12B. In this example, the heart rate of the occupant P is displayed on the monitor 21 together with the message encouraging the occupant P to take the detour route. Thus, the occupant P having seen the message can check the displayed heart rate to check if he/she is really in the resting state.

The controller 100 navigating the car in the autonomous drive mode on an expressway causes, as shown in FIG. 13A, the heart rate of the occupant P to be displayed on the monitor 21. During the autonomous drive mode, the controller 100 determines, based on the respiratory information, whether or not the sleep state of the occupant P is the second sleep state.

If it is determined that the sleep state of the occupant P is the second sleep state, the controller 100 causes, as shown in FIG. 13B, a message encouraging the occupant P to switch to the manual drive mode to be displayed on the monitor 21. Specifically, a message such as "Your sleep has become shallower. It is recommended to switch to manual drive mode now." is displayed on the monitor 21, and a voice corresponding to the message or a sound such as notification sound is outputted from the speaker.

If the occupant P presses the drive-mode-switch button 22 in response to the message, the controller 100 ends the sleep-state-determination process and the ECU ends the autonomous drive control.

Herein, if autonomous drive control is only executed on the expressway, it is desirable, for example, to switch to the manual drive mode at some point in time such as when the car gets off the expressway at an exit or stops at a rest area. However, if the occupant P falls asleep during autonomous drive control, he/she cannot switch the drive mode to the manual drive mode. Thus, it is conceivable that if the occupant P falls asleep, the occupant P is caused to wake up by an alarm or other sound.

However, if the occupant P falls into a deep sleep, the occupant P may not wake up by the alarm or other sound. In contrast to this, the present example presents a proposal to the occupant P for switching to the manual drive mode, such as by an alarm, when the occupant's sleep becomes shallow. Thus, switching from the autonomous drive mode to the manual drive mode can be performed smoothly.

The timing of presenting the proposal for switching to the manual drive mode can be decided by taking into account the distance from the current location of the car to a second destination such as an exit of an expressway or a rest area. The proposal for switching to the manual drive mode can be presented, for example, if a condition that the distance from the current location of the car to the second destination is equal to or shorter than a predetermined distance, and a condition that the sleep state is the second sleep state are both satisfied. The exit of the expressway, which is the second destination, is set by the controller 100 based on the route set by the occupant P. Further, the rest area, which is the second destination, is set by the occupant P, by manually inputting the rest area as the second destination when setting the route.

According to the above-described second example, the following advantageous effects can be obtained.

Since the route with the driving distance longer than the route set by the occupant P is presented when the occupant P assumes the resting state while the car is being driven, the resting state of the occupant can be sustained if the occupant P selects the presented route.

Since the proposal for switching to the manual drive mode is presented if the sleep state of the occupant becomes the second sleep state while the car is being driven in an autonomous drive mode, it is possible to make the occupant P, in a state more conscious than the first sleep state, to more easily become aware of the proposal for switching to the manual drive mode.

Since the biogenic information of the occupant P is accumulated in the server SV together with the identification information, the controller 100 can perform various processes based on the biogenic information accumulated in the server SV.

Since the controller 100 provides a notification of the biogenic information, the occupant P can check his/her biogenic information.

The seat experience system of the above-described second example may be appropriately modified and implemented as shown in other examples described below.

Although the proposal for switching to the manual drive mode is presented when the sleep state has become the second sleep state in the second example, the proposal for switching to the manual drive mode may, for example, be presented when it is determined that a predetermined time period has elapsed after the sleep state has become the first sleep state while the car is being driven in the autonomous drive mode.

Figure 16:
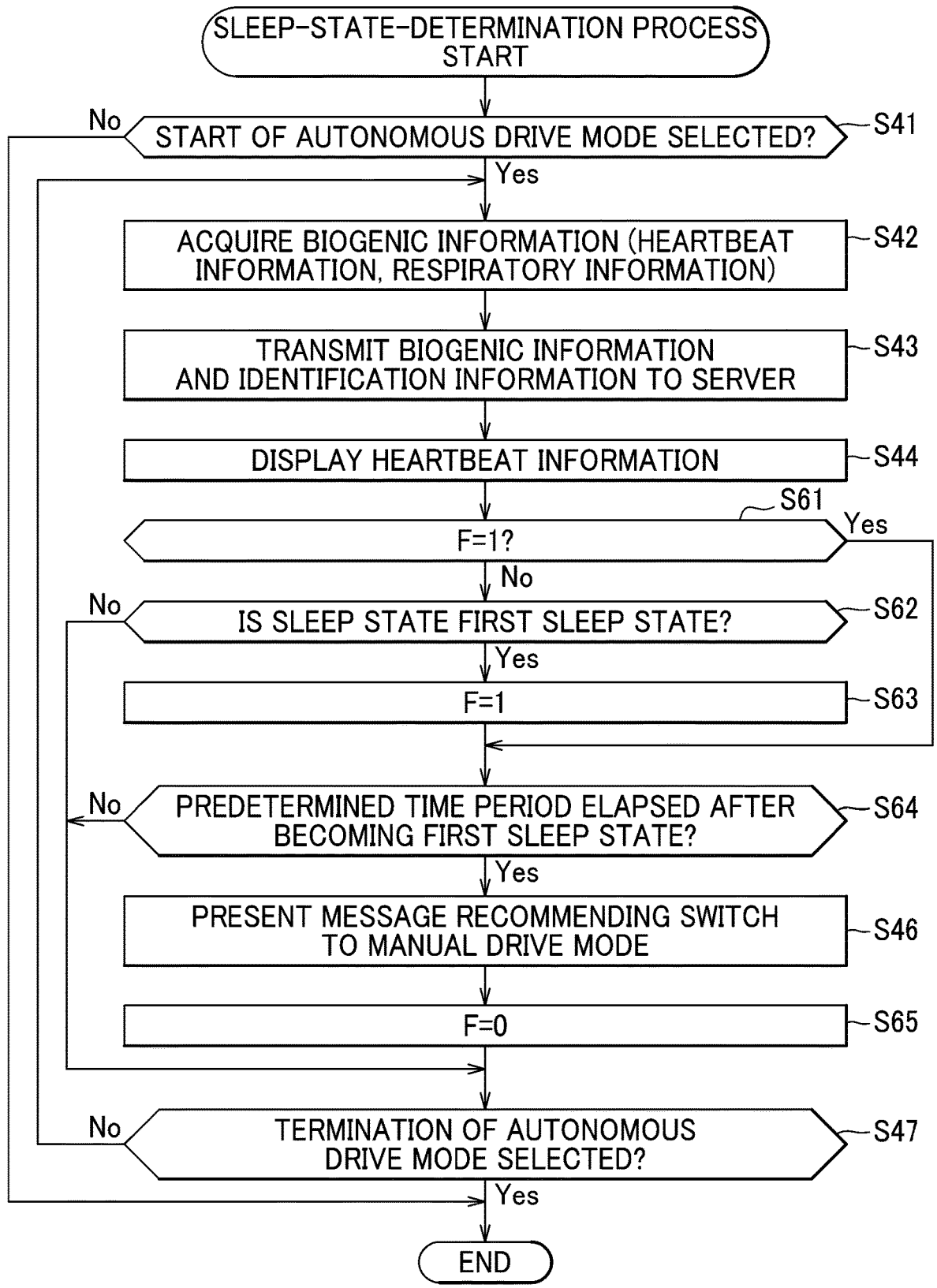
FIG. 16 is a flowchart showing a modified example of the sleep-state-determination process.

In this case, the controller 100 may execute a sleep-state-determination process such as shown in FIG. 16. Herein, the sleep-state-determination process shown in FIG. 16 includes steps S41 to S44, S46, S47 similar to the sleep-state-determination process shown in FIG. 15 and new steps S61 to S65.

Specifically, after executing the processes of steps S41 to S44, the controller 100 determines whether or not a flag F, which indicates that the sleep state of the occupant P has become the first sleep state, is 1 (S61). If it is determined in step S61 that F=1 is not true (No), the controller 100 determines whether or not the sleep state of the occupant P is the first sleep state (S62). If it is determined in step S62 that the sleep state is the first sleep state (Yes), the controller 100 sets the flag F indicating that the sleep state has become the first sleep state to 1 (S63).

After step S63, or if it is determined Yes in step S61, the controller 100 determines whether or not a predetermined time period has elapsed after the sleep state has become the first sleep state (S64).

If it is determined in step S64 that the predetermined time period has elapsed (Yes), the controller 100 presents a message recommending switching to the manual drive mode (S46). After step S46, the controller 100 returns the flag F to zero (S65), and proceeds to the process of step S47. If it is determined No in step S62 or step S64, the controller 100 proceeds to the process of step S47.

According to this example, the proposal for switching to the manual drive mode is presented if the predetermined time period has elapsed after the sleep state has become the first sleep state, i.e., the occupant is in a state more conscious than in the first sleep state, while the car is being driven in the autonomous drive mode. Thus, it is possible to make the occupant, in a state more conscious than in the first sleep state, to more easily become aware of the proposal for switching to the manual drive mode.

Although the heartbeat sensor 11 is given as an example of the sensor for determining whether or not the occupant P is in the resting state in the second example, the sensor can be any kind of sensor as long as it is capable of acquiring the biogenic information for determining whether or not the occupant P is in the resting state. For example, if the pulse of the occupant can be detected by a pressure sensor for detecting the weight of the occupant, the sensor may be the pressure sensor. The respiratory sensor may be a pressure sensor that acquires values of pressure from the occupant, or a radio wave sensor that emits radio waves toward the occupant.

Although a respiratory sensor 12 is given as an example of the sensor for determining the sleep state in the second example, the sensor may, for example, be a brain-wave sensor for detecting brain waves of the occupant. In this case, the method for determining the sleep state may, for example, include a method that determines that the sleep state is the first sleep state if amplitudes of the brain waves are equal to or above a first threshold, and determines that the sleep state is the second sleep state if the amplitudes of the brain waves are lower than a second threshold equal to or lower than the first threshold.

The respiratory sensor and the brain-wave sensor may be used in combination to determine the sleep state. Specifically, it may be determined that the occupant has become conscious (the second sleep state) if it is determined based on the respiratory sensor that the occupant has become conscious, and it is determined that the amplitudes of the brain waves of the occupant have become lower than a predetermined threshold.

The respiratory sensor and a pressure sensor may be used in combination to determine the sleep state of the occupant. Specifically, it may be determined that the occupant has become conscious (the second sleep state) if it is determined based on the respiratory sensor that the occupant has become conscious, and a body motion greater than a predetermined amount (a fluctuation of a pressure value equal to or above a predetermined value) is observed by the pressure sensor.

Biogenic information displayed on the monitor is not limited to heartbeat information, and may include respiratory information, brain wave information, etc.

Although a car is given as an example of a vehicle in the second example, the vehicle may be a vehicle other than the car, for example, a ship, airplane, etc.

The elements described in the above example embodiment and its modified examples may be implemented selectively and in combination.

What is claimed is:

1. A seat experience system comprising:
   a seat comprising a seat body, the seat body comprising:
      a movable part,
      a sensor configured to acquire at least one of heartbeat information, pulse information, respiratory information, or brainwave information of an occupant seated on the seat body, and
      a drive unit configured to operate the movable part; and
   a controller configured to:
      receive a command to change a posture of the seat from a first posture to a second posture; and
      in response to the command,
         acquire the at least one of heartbeat information, pulse information, respiratory information, or brainwave information from the sensor;
         determine whether or not the occupant is in a resting state, based on the acquired at least one of heartbeat information, pulse information, respiratory information, or brainwave information;
         execute, if the occupant is in the resting state, control in a first mode to sustain the resting state;
         execute, if the occupant is not in the resting state, control in a second mode different from the first mode;
         move the movable part to change the posture of the seat from the first posture to the second posture,
         the movable part being moved at a first speed in the first mode and at a second speed in the second mode, the first speed being slower than the second speed;
         discriminate sleep states of the occupant, based on the acquired at least one of heartbeat information, pulse information, respiratory information, or brainwave information, at least between a first sleep state, and a second sleep state having a quality of sleep lower than a quality of sleep of the first sleep state, and present a proposal for switching to a manual drive mode if a sleep state of the occupant becomes the second sleep state while the vehicle is being driven in an autonomous drive mode.

2. The seat experience system according to claim 1, wherein the drive unit is a motor, and
wherein the controller is configured to cause the motor to rotate at a first speed in the first mode and at a second speed in the second mode, the first speed being slower than the second speed.

3. The seat experience system according to claim 2, wherein
the movable part comprises a seat back rotatable relative to a seat cushion, and
the drive unit is configured to cause the seat back to rotate.

4. A seat experience system according to claim 3, wherein
the movable part further comprises an ottoman rotatable relative to the seat cushion, and
the drive unit is configured to cause the ottoman to rotate.

5. The seat experience system according to claim 4, wherein a posture of the seat is changeable between a first posture in which the seat back forms a first angle with respect to a horizontal plane, and a second posture in which the seat back forms a second angle, smaller than the first angle, with respect to the horizontal plane, and
wherein the controller is configured to determine, upon receipt of a command to change the posture of the seat from the second posture to the first posture, whether or not the occupant is in the resting state.

6. The seat experience system according to claim 5, wherein the controller is configured to control the drive unit such that the ottoman forms a third angle with respect to a seating surface of the seat cushion when the seat assumes the first posture, and the ottoman forms a fourth angle, smaller than the third angle, with respect to the seating surface of the seat cushion when the seat assumes the second posture.

7. The seat experience system according to claim 1, further comprising:
a speaker that produces a sound,
wherein the controller is configured to adjust a volume of the speaker when the speaker is producing the sound, such that if the occupant is in the resting state, the volume of the speaker is turned down.

8. The seat experience system according to claim 1, further comprising:
a speaker that produces a sound,
wherein the controller is configured to adjust a volume of the speaker in the first mode to a volume smaller than a volume of the speaker in the second mode.

9. A seat experience system, comprising:
a seat comprising:
a seat body, and
a sensor configured to acquire biogenic information of an occupant seated on the seat body; and
a controller configured to:
acquire the biogenic information from the sensor;
determine whether or not the occupant is in a resting state, based on the biogenic information;
execute, if the occupant is in the resting state, control in a first mode to sustain the resting state; and
execute, if the occupant is not in the resting state, control in a second mode different from the first mode,
wherein the seat is a vehicle seat, and the seat body is installed in a vehicle,
wherein the controller is configured to execute a navigation process for navigating the vehicle to a destination according to a route set by the occupant, and wherein further
when the navigation process is executed in the second mode, the route set by the occupant is presented, and
when the navigation process is executed in the first mode, a route with a driving distance longer than a driving distance of the route set by the occupant is presented, and
wherein the controller is further configured to:
discriminate sleep states of the occupant, based on the biogenic information, at least between a first sleep state, and a second sleep state having a quality of sleep lower than a quality of sleep of the first sleep state, and
present a proposal for switching to a manual drive mode if a sleep state of the occupant becomes the second sleep state while the vehicle is being driven in an autonomous drive mode.

10. The seat experience system according to claim 9, wherein
the sensor comprises a pressure sensor that acquires a value of pressure from the occupant, and
the controller discriminates the sleep states of the occupant based on the respiratory information and the value of pressure.

11. The seat experience system according to claim 9, wherein the controller is configured to:
discriminate sleep states of the occupant, based on the biogenic information, at least between a first sleep state, and a second sleep state having a quality of sleep lower than a quality of sleep of the first sleep state, and
present a proposal for switching to a manual drive mode if a predetermined time period has elapsed after a sleep state of the occupant has become the first sleep state while the vehicle is being driven in an autonomous drive mode.

12. The seat experience system according to claim 10, wherein
the sensor comprises a respiratory sensor that acquires respiratory information of the occupant, and
the controller discriminates the sleep states of the occupant based on the respiratory information.

13. The seat experience system according to claim 9, further comprising:
a server capable of communicating with the controller, wherein
the controller is configured to transmit the biogenic information acquired from the sensor to the server together with identification information of the occupant, and
the server stores the biogenic information transmitted from the controller together with the identification information.

14. The seat experience system according to claim 9, wherein the controller provides a notification of the biogenic information acquired from the sensor.

15. A seat experience system according to claim 9, comprising:
a seat comprising:
a seat body, and a sensor configured to acquire biogenic information of an occupant seated on the seat body; and
a controller configured to:
acquire the biogenic information from the sensor;
determine whether or not the occupant is in a resting state, based on the biogenic information;

execute, if the occupant is in the resting state, control in a first mode to sustain the resting state; and execute, if the occupant is not in the resting state, control in a second mode different from the first mode,
- wherein the seat is a vehicle seat, and the seat body is installed in a vehicle,
- wherein the controller is configured to execute a navigation process for navigating the vehicle to a destination according to a route set by the occupant, and wherein further
  - when the navigation process is executed in the second mode, the route set by the occupant is presented, and
  - when the navigation process is executed in the first mode, a route with a driving distance longer than a driving distance of the route set by the occupant is presented, and wherein the controller is further configured to:

discriminate sleep states of the occupant, based on the biogenic information, at least between a first sleep state, and a second sleep state having a quality of sleep lower than a quality of sleep of the first sleep state, and present a proposal for switching to a manual drive mode if a predetermined time period has elapsed after a sleep state of the occupant has become the first sleep state while the vehicle is being driven in an autonomous drive mode.

* * * * *